United States Patent
Mikic et al.

(10) Patent No.: US 12,486,016 B2
(45) Date of Patent: Dec. 2, 2025

(54) HIGH EFFICIENCY AIR INTAKE SYSTEM AND AIRCRAFT USING SAME

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US); Edward Stilson, Santa Cruz, CA (US); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/622,869

(22) Filed: Mar. 30, 2024

(65) Prior Publication Data

US 2024/0326979 A1    Oct. 3, 2024

Related U.S. Application Data

(60) Provisional application No. 63/456,804, filed on Apr. 3, 2023.

(51) Int. Cl.
*B64C 29/00* (2006.01)
*B64C 5/02* (2006.01)

(52) U.S. Cl.
CPC ............ *B64C 5/02* (2013.01); *B64C 29/0033* (2013.01)

(58) Field of Classification Search
CPC ......... B64C 7/00; B64C 7/02; B64C 2230/08; B64C 2230/20; B64C 29/0033; B64U 10/10; B64U 20/96; B64D 2241/00; B64D 27/24
See application file for complete search history.

(56) References Cited

U.S. PATENT DOCUMENTS

| | | | |
|---|---|---|---|
| 11,787,554 B2 * | 10/2023 | Regnier | B64D 27/31 244/135 R |
| 2020/0388865 A1 * | 12/2020 | Rainville | H01M 8/04014 |
| 2020/0407060 A1 * | 12/2020 | Hosseini | B64C 13/38 |
| 2022/0161927 A1 * | 5/2022 | Moore | B64C 35/001 |
| 2024/0014745 A1 * | 1/2024 | Waltrich | B64D 27/24 |
| 2024/0294264 A1 * | 9/2024 | Lellek | H01M 8/04111 |

* cited by examiner

*Primary Examiner* — Timothy D Collins
*Assistant Examiner* — Justin Michael Heston
(74) *Attorney, Agent, or Firm* — Michael A. Guth

(57) ABSTRACT

An aerial vehicle configured with air intake in an otherwise higher drag location. In some aspects, the aerial vehicle is a vertical take-off and landing aircraft. The aircraft may intake the air to provide air to a hydrogen fuel cell system within the aircraft. The aircraft may have electric motor driven rotor assemblies which provide thrust for both vertical take-off and landing and forward flight operations. The electric motor driven rotor assemblies may be powered by electric power from the fuel cell system. The air intake may be on the forward portion of a nacelle placed in what would be a high drag location, such as at the junction of the wings and the fuselage, or the junction of the vertical stabilizers and the fuselage, for example.

8 Claims, 24 Drawing Sheets

HIGH EFFICIENCY AIR INTAKE SYSTEM AND AIRCRAFT USING SAME

CROSS-REFERENCE TO RELATED APPLICATIONS

This application claims priority to U.S. Provisional Patent Application No. 63/456,804 to Mikic et al., filed Apr. 3, 2023, which is hereby incorporated by reference in its entirety.

FIELD OF THE INVENTION

This invention relates to aerial vehicles, including an aerial vehicle with a high efficiency low drag air intake system.

SUMMARY

Figure 1A:
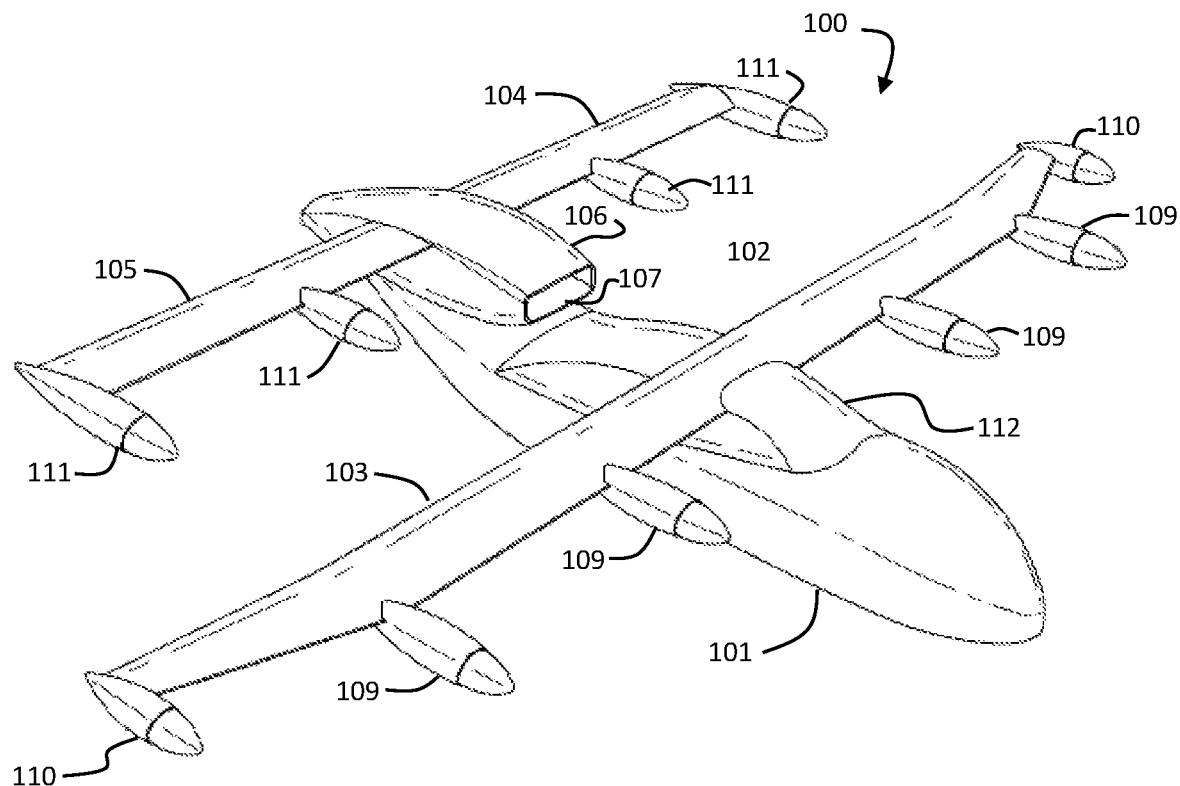
FIGS. 1A-D are views of an aerial vehicle in a first configuration according to some embodiments of the present invention.
Figure 1B:
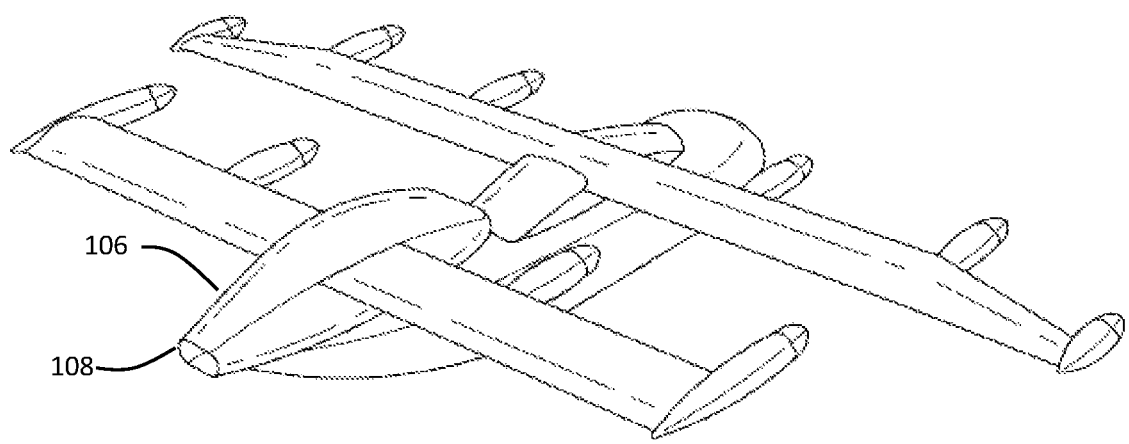

An aerial vehicle configured with air intake in an otherwise higher drag location. In some aspects, the aerial vehicle is a vertical take-off and landing aircraft. The aircraft may intake the air to provide air to a hydrogen fuel cell system within the aircraft. The aircraft may have electric motor driven rotor assemblies which provide thrust for both vertical take-off and landing and forward flight operations. The electric motor driven rotor assemblies may be powered by electric power from the fuel cell system. The air intake may be on the forward portion of a nacelle placed in what would be a high drag location, such as at the junction of the wings and the fuselage, or the junction of the vertical stabilizers and the fuselage, for example.

DETAILED DESCRIPTION

In a first embodiment of the present invention, as seen in FIGS. 1A-D, an aerial vehicle 100 has an airflow nacelle 106 located at the structural coupling points of the left side horizontal stabilizer 104 and the right side horizontal stabilizer 105. In utilizing this location, the air inlet 107 of the airflow nacelle 106 integrates air inflow into an otherwise unused, and high drag, portion of the aerial vehicle 100. The aerial vehicle 100 may be a tiltrotor aircraft, as discussed further below. In this illustrative example, the airflow nacelle 106 resides in what would otherwise have been a high drag area where the horizontal stabilizers 104, 105 couple to the main body fuselage 101.

Figure 1C:
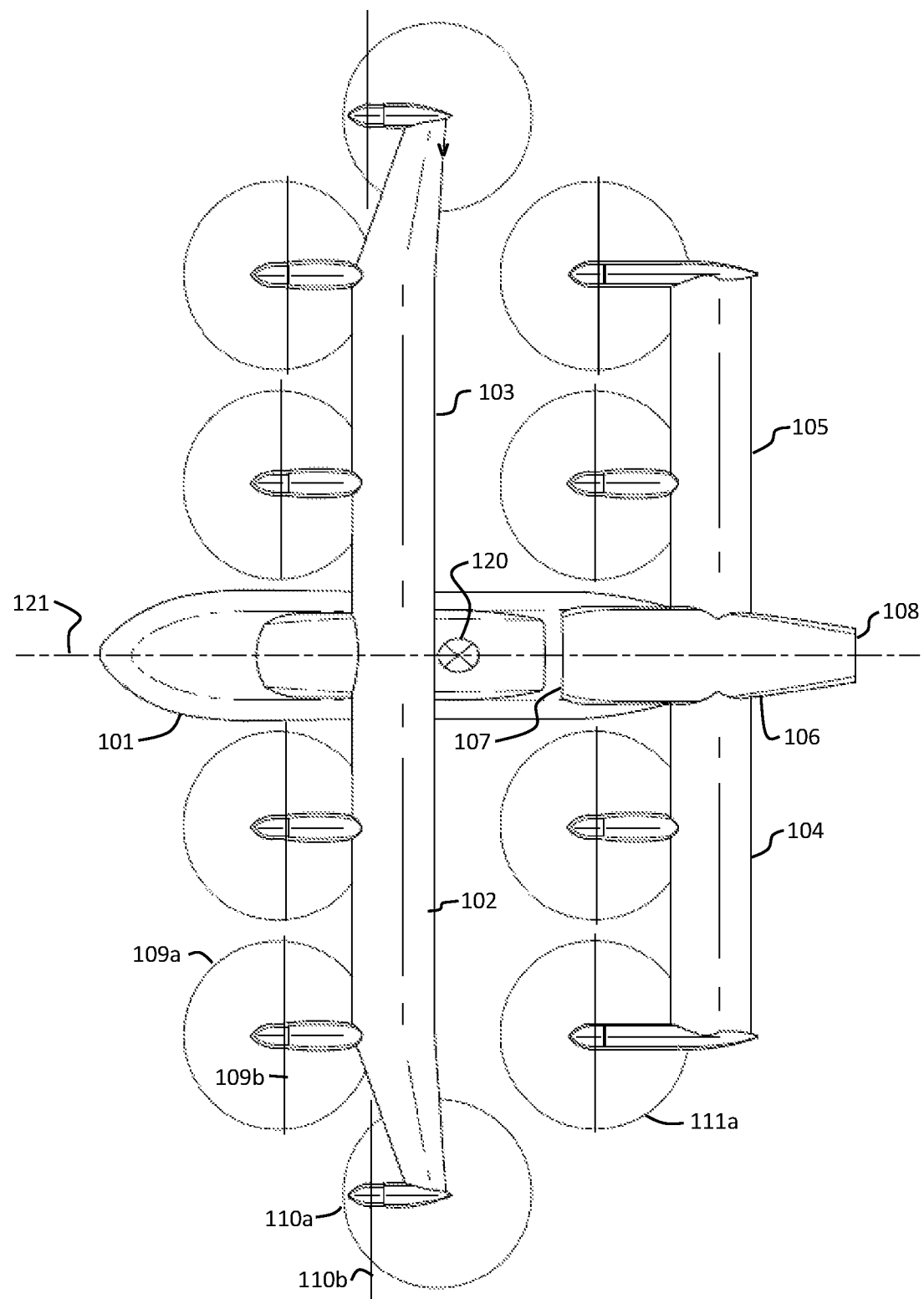
Figure 1D:
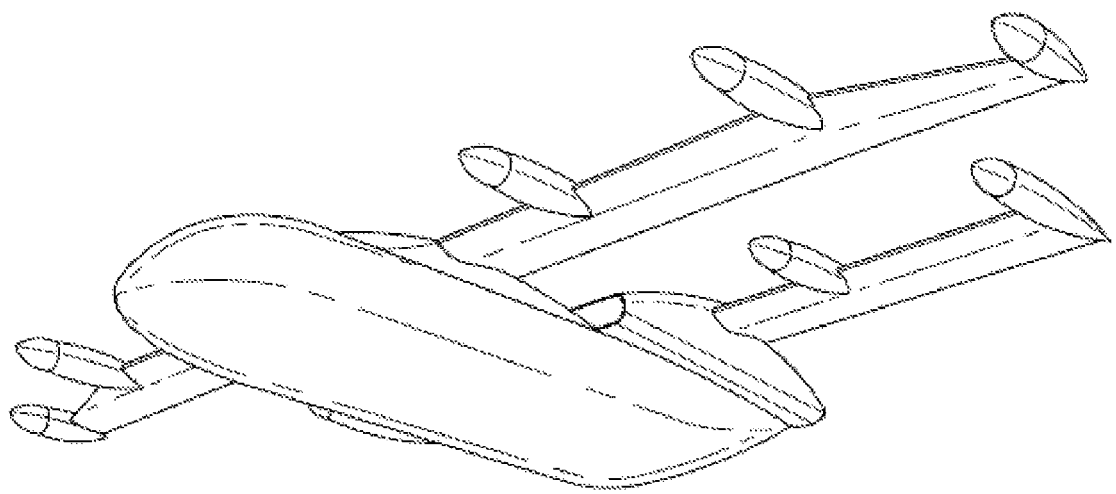

The airflow nacelle 106 is located above the main body fuselage 101 of the aerial vehicle 100. A left wing 102 has inboard rotor assemblies 109 and a wingtip rotor assembly 110. FIG. 1C illustrates the disc sweep of the propellers of the rotor assemblies both in forward flight configuration 109b, 110b and in the vertical take-off and landing (hover) configuration 109a, 110a. It is to be understood that the propellers of the rotor assemblies 109, 110 are omitted for clarity in other views. Likewise, the rotor assemblies of other embodiments below may be omitted for clarity. Similarly, the right wing 103 has inboard rotor assemblies 109 and a wingtip rotor assembly 110.

A left side horizontal stabilizer 104 has rear rotors 111 attached, and a right side horizontal stabilizer 105 which has rear rotors 111 attached. Although described as having a right and left side horizontal stabilizer, the aerial vehicle 100 could be viewed as a tandem wing configuration. In some aspects, the left wing 102 and the right wing 103 couple to the main body fuselage 101 at or above a top surface of the main body fuselage 101. With the wings coupled to the main body fuselage at or above the top surface of the main body fuselage, more space is allocated within the main body fuselage 101 for passengers or cargo. The propellers of the rotor assemblies have been omitted from some figures for clarity in this and subsequent embodiments, but are discussed in more detail below.

In this first embodiment, the eight rotors other than the wingtip rotors are equally distributed around the center of gravity 120 of the aerial vehicle 100, which may be an important factor during hover flight. Also, the rotors are located to minimize the down flow impingement of the rotors onto the wings during hover flight. The longitudinal axis 121 and the center of gravity 120 location during loaded flight are seen in the top view of FIG. 1C, and the longitudinal axis and e.g. location are similarly shown in the top views of the subsequent embodiments.

The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

As will be seen in the top views of all of the embodiments described herein, there is a balance between the lift of the front wing versus the rear wing (or horizontal stabilizers) that then feeds into the longitudinal location of the main wing to preserve the desired location of the aerodynamic center of the lifting surfaces relative to the center of gravity of the aerial vehicle, within design bounds.

With this configuration, more room is available within the fuselage for passengers, cargo, or other equipment. Forward of the coupling location of the left wing 102 and the right wing 103 to the main body fuselage 101 is a section 112 of the upper surface of the fuselage. As will be seen in other embodiments below, this area of drag creation may be utilized as the location of the airflow nacelle in some aspects.

The airflow nacelle, having an air inlet 107 at a forward end of the airflow nacelle 106, has an airflow exit 108 at a rearward end of the airflow nacelle. In some aspects, the inletted air may be routed to a thermodynamic fuel cell system, as discussed further below. In some aspects, the inletted air is routed through heat exchangers which form part of the fuel cell system. In some aspects, there is no engine, including jet engines, turbojet, or other type of engine within the airflow nacelle.

The tiltrotor aircraft 100 functions to provide an aerial vehicle operable between a hover mode (e.g., rotary-wing mode) and a forward mode (e.g., fixed-wing mode). The hover mode can include vertical takeoff, vertical landing, and/or substantially stationary hovering of the aircraft 100; however, the hover mode can additionally or alternatively include any suitable operating mode wherein vertically-directed thrust is generated by one or more of the plurality of propulsion assemblies. The forward mode can include forward flight, horizontal takeoff, and/or horizontal landing of the aircraft 100 (e.g., conventional take-off and landing/ CTOL); however, the forward mode can additionally or alternatively include any suitable operating mode wherein horizontally-directed thrust is generated by one or more of the plurality of propulsion assemblies. Thus, the hover mode and forward mode are not mutually exclusive, and the tiltrotor aircraft 100 can operate in a superposition of the hover mode and the forward mode (e.g., wherein the plurality of propulsion assemblies is arranged in a superposition of the hover arrangement and the forward arrangement defined by a liminal configuration of each of the plurality of propulsion assemblies between the hover configuration and the forward configuration). The tiltrotor aircraft 100 can also function to provide an aerial vehicle that is stable in hover mode (e.g., maximally stable, stable within a defined stability window or envelope of flight conditions, stable up to a stability threshold magnitude of various control inputs to the aircraft 100, etc.) and efficient (e.g., aerodynamically efficient, power efficient, thermodynamically efficient, etc.) in forward mode. The tiltrotor aircraft can also function to provide airborne transportation to passengers and/or cargo. However, the tiltrotor aircraft 100 can additionally or alternatively have any other suitable function.

The tiltrotor aircraft 100 is operable between a plurality of modes, including a hover mode and a forward mode. In the hover mode, the plurality of propulsion assemblies can be arranged in the hover arrangement. In the hover arrangement, each of the plurality of propellers is preferably arranged in the hover configuration. In the forward mode, the plurality of propulsion assemblies can be arranged in the forward arrangement. In the forward arrangement, each of the plurality of propellers is preferably arranged in the forward configuration. However, each of the plurality of propellers can be arranged in any suitable state between the forward and hover configurations, independently of one another, and/or in any other suitable orientation in the hover mode of aircraft 100 operation; furthermore, each of the plurality of propellers can be arranged in any suitable state between the forward and hover configurations, independently of one another, and/or in any other suitable orientation in the forward mode of aircraft 100 operation. Furthermore, the tiltrotor aircraft 100 can be operated in any suitable liminal mode between the hover mode and forward mode, wherein a component of thrust generated by one or more propulsion assemblies 120 is directed along both the vertical axis and the longitudinal axis (e.g., and/or the lateral axis).

Though the aircraft 100 is referred to herein as a tiltrotor aircraft 100, the terms "propeller" and "rotor" as utilized herein can refer to any suitable rotary aerodynamic actuator, commonly referred to as a rotor, a propeller, a rotating wing, a rotary airfoil, and the like. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of propeller can refer to either configuration, and any other possible configuration of articulated or rigid blades, and/or any other possible configuration of blade connections to a central member or hub. Accordingly, the tiltrotor aircraft 100 can be referred to as a tilt-propeller aircraft 100, a tilt-prop aircraft 100, and/or otherwise suitably referred to or described. In the context of an electric motor, which in some variations can include a stator and rotor, the rotor of the electric motor can refer to the portion of the motor that rotates as electrical potential energy is converted to rotational kinetic energy in operation of the electric motor.

The tiltrotor aircraft 100 includes a plurality of propulsion assemblies coupled to the airframe at a corresponding plurality of propulsion assembly attachment points. Each propulsion assembly preferably includes include a propeller, a tilt mechanism, and an electric motor. The propulsion assembly functions to house and collocate the propeller, the tilt mechanism, the electric motor, and any other suitable components related to the propeller and electromechanical drive thereof.

The propeller of the propulsion assembly functions to convert rotational kinetic energy supplied by the electric motor to aerodynamic forces (e.g., for propelling the aircraft 100 in the hover mode, the forward mode, etc.). The propeller can include a number of propeller blades (e.g., blades, airfoils, etc.), a head (e.g., a hub and associated linkages), and any other suitable components. The propeller may be a variable-pitch propeller (e.g., wherein the pitch of each propeller blade is variable coordination such as via collective control, wherein the pitch of each propeller blade is independently variable such as via cyclic control, etc.), but can additionally or alternatively be a fixed-pitch propeller. In some variations, the aircraft 100 can include both variable-pitch and fixed-pitch propeller associated with different propulsion assemblies of the plurality of propulsion assemblies. In additional or alternative variations, the propeller can be articulated into a negative angle of attack condition, which can function to produce reverse thrust without changing the direction of rotation of the propeller. The propeller can define any suitable disc area (e.g., propeller disc, disc, etc.), and each blade can define any suitable cross section and/or twist angle as a function of blade span.

In a specific example, each propeller of the plurality of propulsion assemblies includes a set of propeller blades attached to the hub by a variable pitch linkage that rotates each propeller blade about a long axis of the propeller blade and constrains propeller blade motion normal to the disc plane (e.g., the propeller blade does not substantially articulate forward or backward from the disc plane).

The tiltrotor aircraft 100 can include a power distribution system that couples an electric power source to each electrically-powered component (e.g., including each electric motor). The power distribution system can include an electrical power transmission bus that distributes power from a plurality of electric power sources to components of the aircraft 100 requiring electrical power. Each propulsion assembly is preferably connected to at least one associated electric power source that powers the electric motor assembly of the propulsion assembly. However, the electric power sources can additionally or alternatively be interconnected to one another and/or to one or more propulsion assemblies such that any propulsion assembly (or other powered component) can draw electrical power from any suitable subset of electric power sources of the aircraft 100, with any suitable relative power draw between electric power sources.

Although the tiltrotor aircraft description, above, has been introduced with regard to the first embodiment of the aerial vehicle 100, it is to be understood that each of the subsequent embodiments discussed below may also be tiltrotor aircraft in accord with the above description.

FIG. 1C illustrates an aspect of the tiltrotor aircraft in that the outer periphery of the propeller sweep in vertical take-off and landing (hover) configuration is shown. The front inboard rotor assemblies 109 are shown with their hover propeller sweep 109a. With these rotor assemblies 109, the rotor assemblies 109 may deploy to a hover position by having a deployment mechanism deploy the rotor forward and upward during deployment. In some aspects, the rotor assemblies 109 may pivot into a deployed position. Similarly, the rear rotor assemblies 111 are shown with their hover propeller sweep 111a. With these rotor assemblies 111, the rotor assemblies 111 may deploy to a hover position by having a deployment mechanism deploy the rotor forward and upward during deployment. The wingtip rotor assemblies 110 may deploy upward using a pivot deployment, as the propeller sweep 110a of the wingtip rotor assemblies 110 does not impinge on the wings as severely as would be seeing with inboard rotor assemblies. In addition, the pivoting deployment may place the most outboard rotor assemblies in a location somewhat closer to the center of mass of the aerial vehicle while in hover mode, which may provide control advantages.

In some aspects, the inletted air may route to a high efficiency hydrogen fueled thermodynamic fuel cell system residing within the aerial vehicle. In some aspects, the system is adapted to deliver electricity to power an electrically powered aircraft, which may then use the electricity to power electric motors. In some aspects, the system additionally provides thrust as part of the air outletting from the system.

In some aspects, the airflow nacelle 106 may house a diffuser and heat exchanger system as discussed further below with regard to FIG. 14.

The hydrogen fueled thermodynamic fuel cell system may include a series of intertwined pathways, such as one or more pathways for intake air, a pathway for hydrogen, a pathway for byproducts from the fuel cell, and a pathway for water condensed out from the byproducts from the fuel cell.

In a second embodiment of the present invention, an aerial vehicle 250 has an airflow nacelle 256 located at the structural coupling point of the vertical stabilizer 255 and the main body fuselage 251. In utilizing this location, the air inlet 257 of the airflow nacelle 256 integrates air inflow into an otherwise unused, and high drag, portion of the aerial vehicle 250. The aerial vehicle 250 may be a tiltrotor aircraft, as discussed above.

The airflow nacelle 256 is located above the main body fuselage 251 of the aerial vehicle 250. With the wings coupled to the main body fuselage at or above the top surface of the main body fuselage, more space is allocated within the main body fuselage 251 for passengers or cargo. A left wing 252 has inboard rotor assemblies 259 and a wingtip rotor assembly 260. Similarly, the right wing 253 has inboard rotor assemblies 259 and a wingtip rotor assembly 260. A horizontal stabilizer 254 has rear rotors 261 attached. In some aspects, the left wing 252 and the right wing 253 couple to the main body fuselage 251 at or above a top surface of the main body fuselage 251. The propellers of the rotor assemblies have been omitted from the figures for clarity in this and subsequent embodiments. The propellers may be configured in the rotor assemblies as was discussed with regard to FIG. 1C, above. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

In this second embodiment, the right wing 253 and the left wing 252 are further back along the longitudinal axis of the aircraft compared to the first embodiment, as there is less rear lifting surface area and fewer rear rotors. Also, the main wing may have a longer chord to provide more torsional stiffness.

Figure 2A:
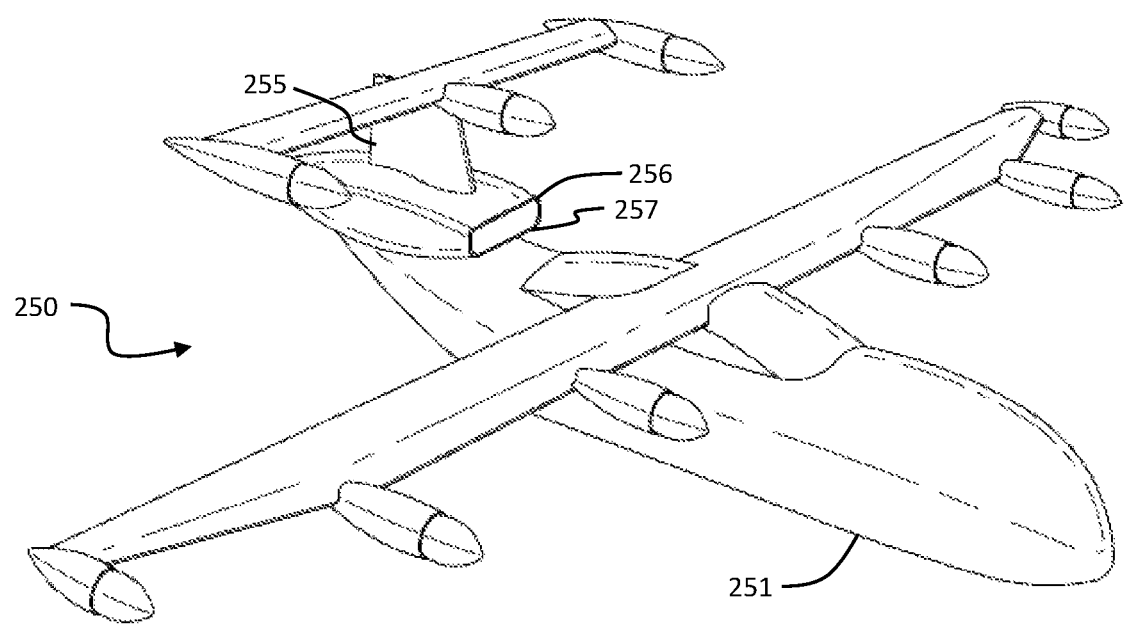
FIGS. 2A-C are views of an aerial vehicle in a second configuration according to some embodiments of the present invention.
Figure 2B:
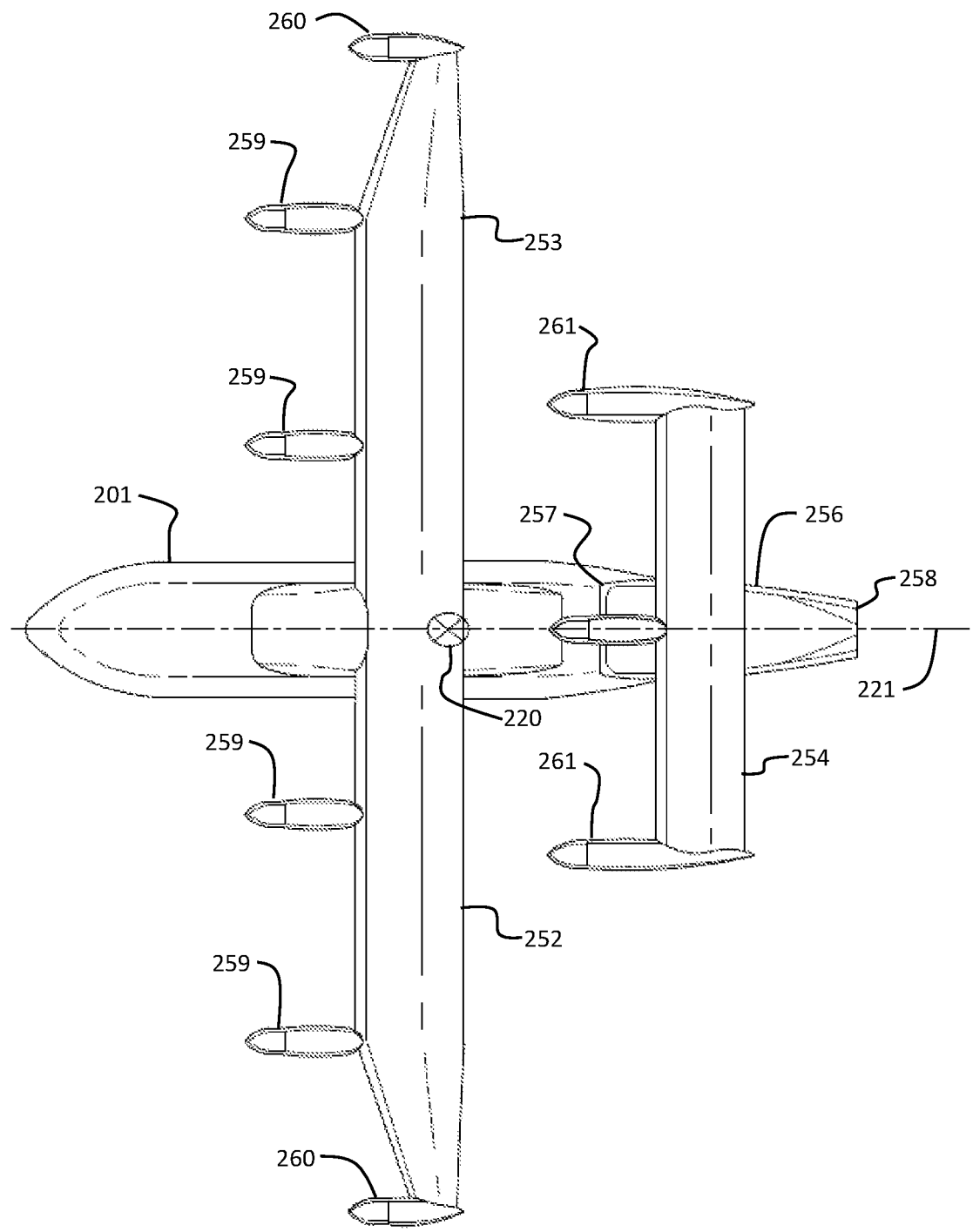
Figure 2C:
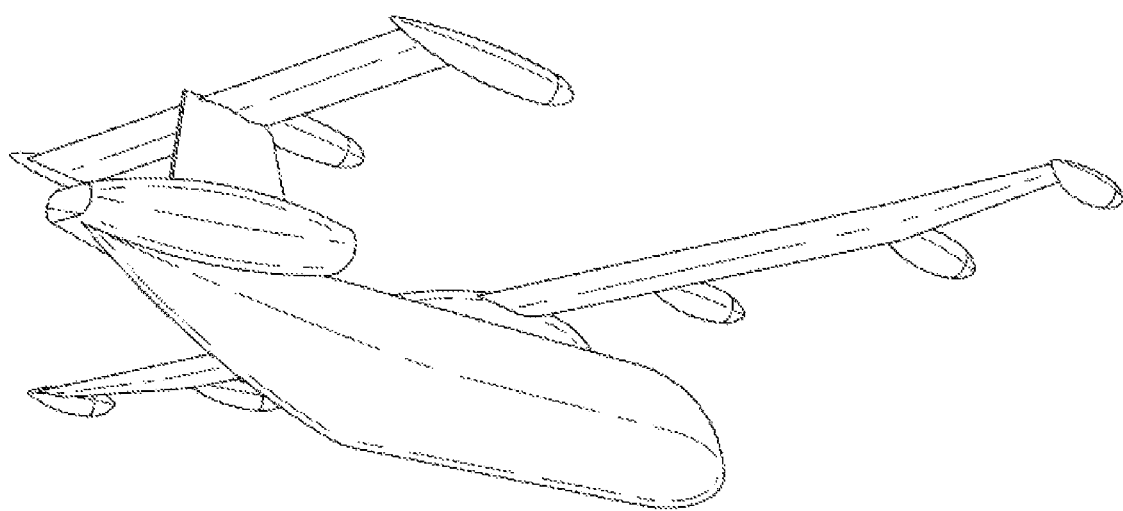
Figure 3A:
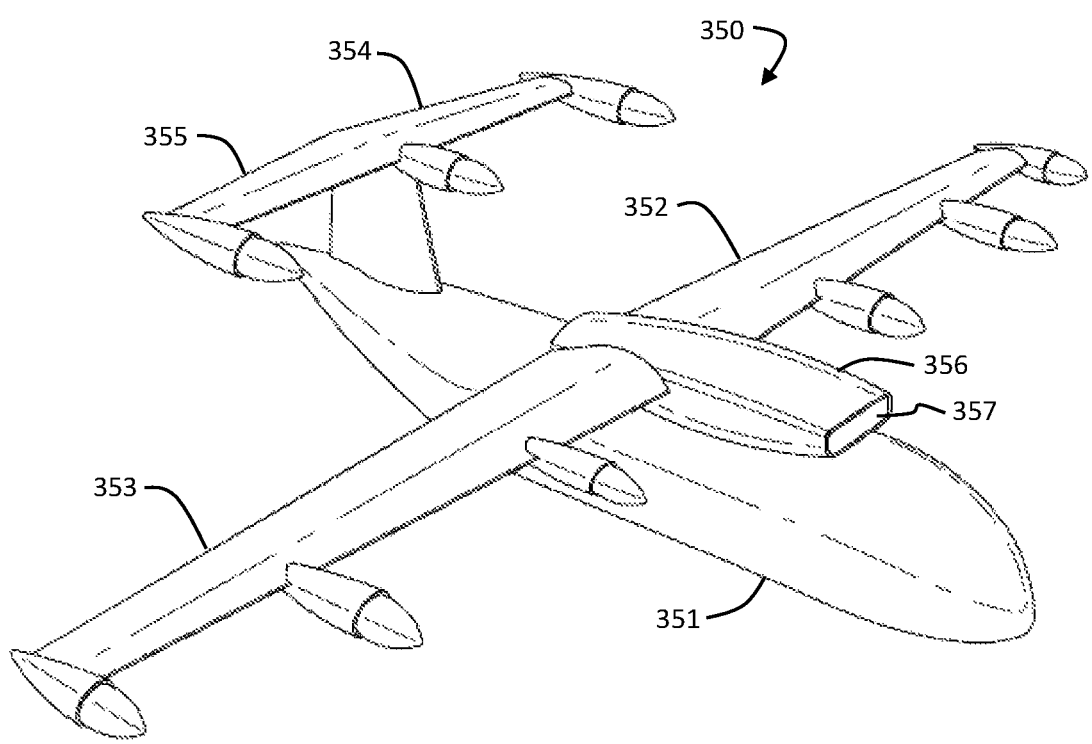
FIGS. 3A-D are views of an aerial vehicle in a third configuration according to some embodiments of the present invention.
Figure 3B:
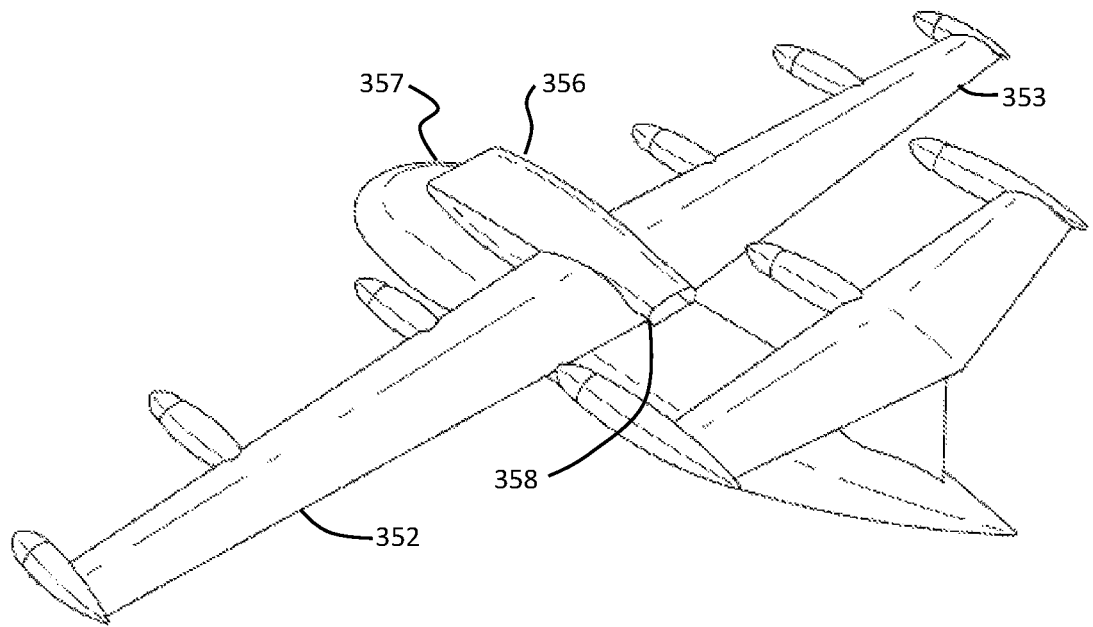
Figure 3C:
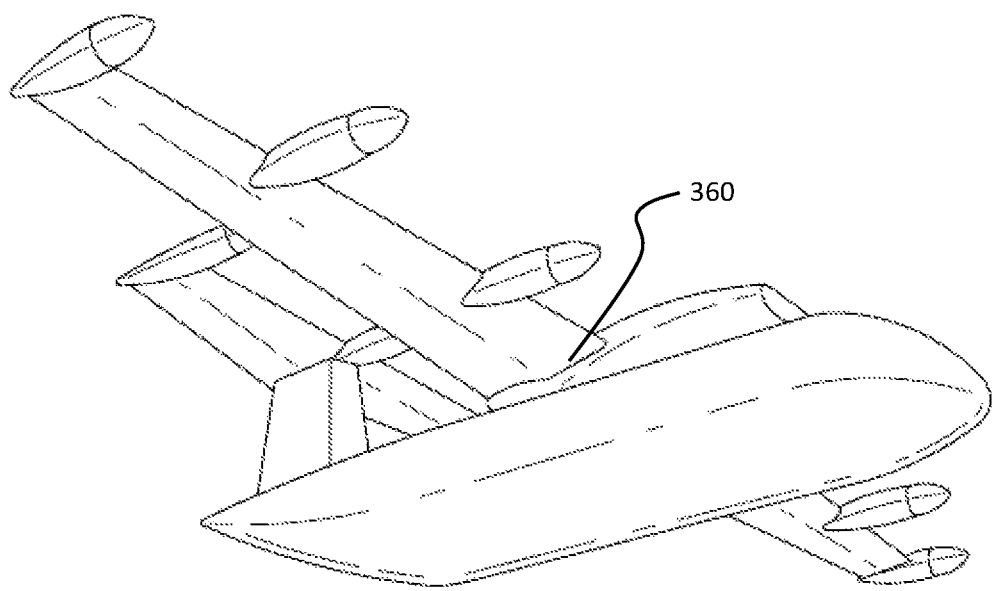
Figure 3D:
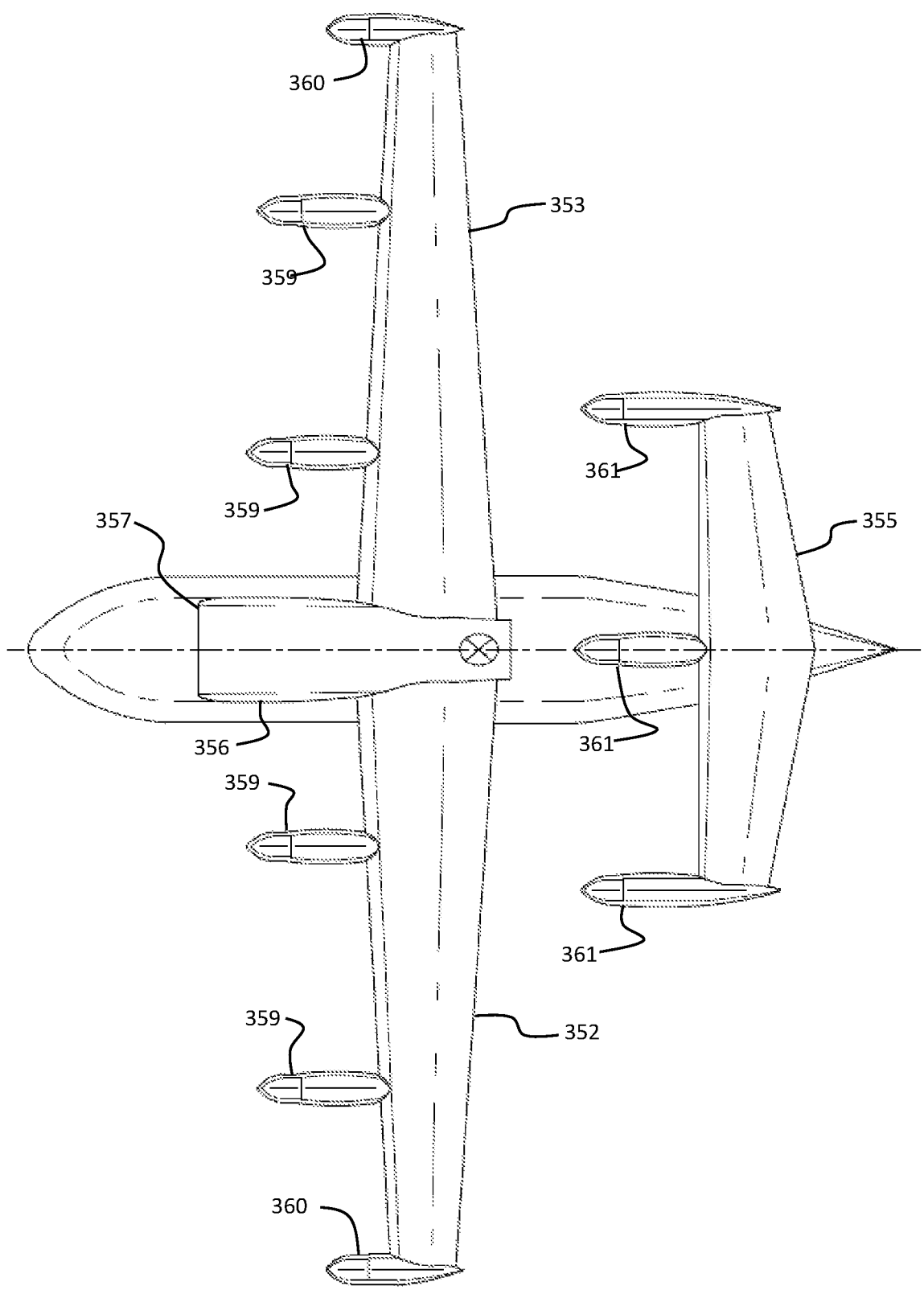

The airflow nacelle 256, having an air inlet 257 at a forward end of the airflow nacelle 256, has an airflow exit 258 at a rearward end of the airflow nacelle. In some aspects, the inletted air may be routed to a thermodynamic fuel cell system, as discussed further below. In some aspects, the inletted air is routed through heat exchangers which form part of the fuel cell system. The longitudinal axis 221 and the center of gravity 220 location during loaded flight are seen in the top view of FIG. 2B.

In a third embodiment of the present invention, as seen in FIGS. 3A-D, an aerial vehicle 350 has an airflow nacelle 356 located at the structural coupling point of the wings 352, 353 and the main body fuselage 351. In utilizing this location, the air inlet 357 of the airflow nacelle 356 integrates air inflow into an otherwise unused, and high drag, portion of the aerial vehicle 350. With the wings 352, 353 raised above the fuselage 351, an area that may have produced higher drag has been utilized as the air inlet location. The aerial vehicle 350 may be a tiltrotor aircraft, as discussed above. With the wings coupled to the main body fuselage at or above the top surface of the main body fuselage, more space is allocated within the main body fuselage 351 for passengers or cargo.

The airflow nacelle 356 is located above the main body fuselage 351 of the aerial vehicle 350. A left wing 352 has inboard rotor assemblies 359 and a wingtip rotor assembly 360. Similarly, the right wing 353 has inboard rotor assemblies 359 and a wingtip rotor assembly 360. A horizontal stabilizer 355 has rear rotors 361 attached. In some aspects, the left wing 352 and the right wing 353 couple to the main body fuselage 351 at or above a top surface of the main body fuselage 351. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

In this third embodiment, the right wing 353 and the left wing 352 are further back along the longitudinal axis of the aircraft compared to the first embodiment, as there is less rear lifting surface area and fewer rear rotors, but has a different location for the airflow nacelle 356 than was seen in the second embodiment. The longitudinal axis and the center of gravity location during loaded flight are seen in the top view of FIG. 3D.

The airflow nacelle 356, having an air inlet 357 at a forward end of the airflow nacelle 356, has an airflow exit 358 at a rearward end of the airflow nacelle. In some aspects, the inletted air may be routed to a thermodynamic fuel cell system, as discussed further below. In some aspects, the inletted air is routed through heat exchangers which form part of the fuel cell system.

In a fourth embodiment of the present invention, as seen in FIGS. 4A-E, an aerial vehicle 400 has an airflow nacelle 406 located at the structural coupling point of the wings 402, 403 and the main body fuselage 401, with the wingset placed rearward on the fuselage, and a lower front canard structure. In utilizing this location for the airflow nacelle, the air inlet 407 of the airflow nacelle 406 integrates air inflow into an otherwise unused, and high drag, portion of the aerial vehicle 400. With the wings coupled to the main body fuselage at or above the top surface of the main body fuselage, more space is allocated within the main body fuselage 401 for passengers or cargo. With the wings 402, 403 raised above the fuselage 401, an area that may have produced higher drag has been utilized as the air inlet location. The aerial vehicle 400 may be a tiltrotor aircraft, as discussed above. The longitudinal axis and the center of gravity location during loaded flight are seen in the top view of FIG. 4C.

The airflow nacelle 406 is located above the main body fuselage 401 of the aerial vehicle 401. A left wing 402 has inboard rotor assemblies 409 and a wingtip rotor assembly 410. Similarly, the right wing 403 has inboard rotor assemblies 409 and a wingtip rotor assembly 410. Horizontal stabilizers 404, 405 forming a v-tail have rear rotors 411 attached. A right front canard 421 and a left front canard 420 also have rotors attached. In some aspects, the left wing 402 and the right wing 403 couple to the main body fuselage 401 at or above a top surface of the main body fuselage 401. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

In this fourth embodiment, there are three stations along the longitudinal axis with rotors. Each of the three stations are at different elevations, minimizing the chopping of the wake of the wing by rotors rearward of a wing.

The airflow nacelle 406, having an air inlet 407 at a forward end of the airflow nacelle 406, has an airflow exit 408 at a rearward end of the airflow nacelle. In some aspects, the inletted air may be routed to a thermodynamic fuel cell system, as discussed further below. In some aspects, the inletted air is routed through heat exchangers which form part of the fuel cell system.

Figure 4A:
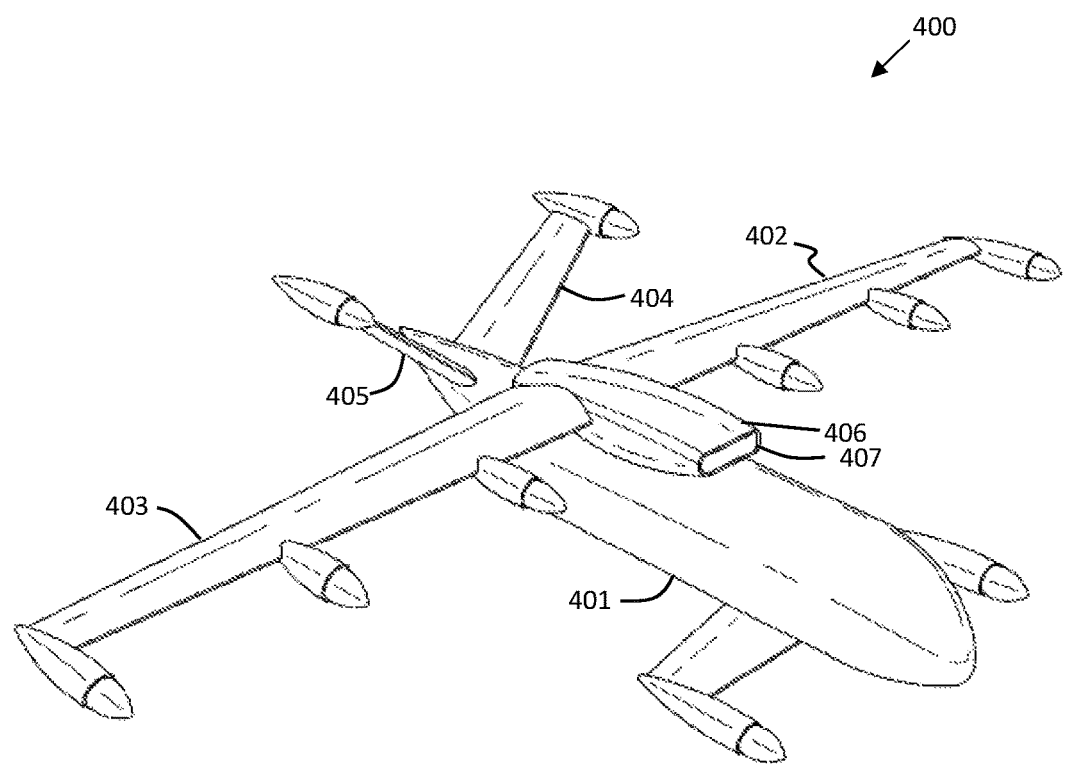
FIGS. 4A-E are views of an aerial vehicle in a fourth configuration according to some embodiments of the present invention.
Figure 4B:
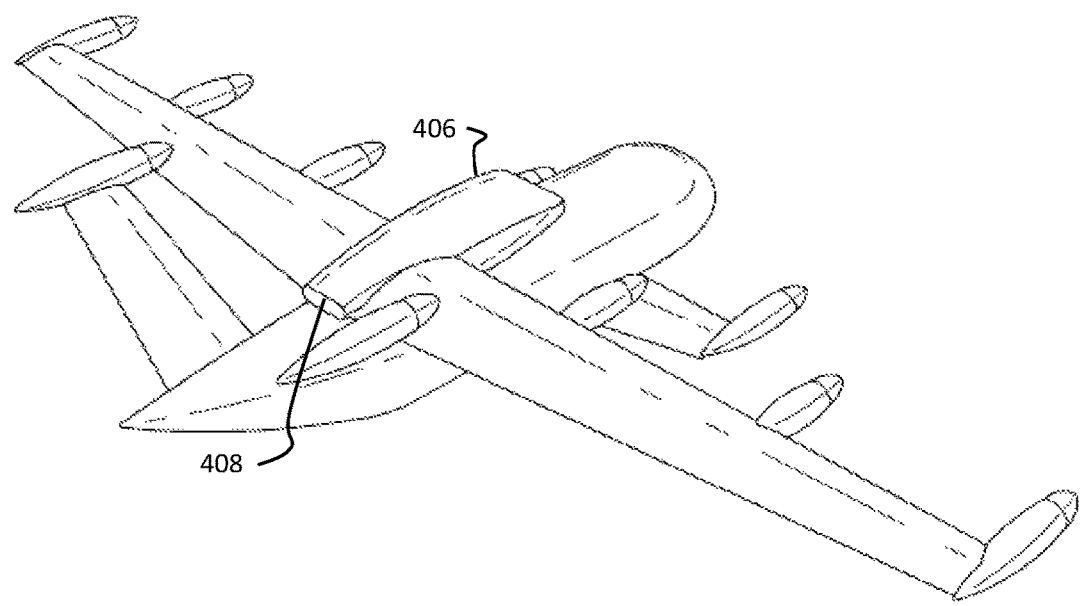
Figure 4C:
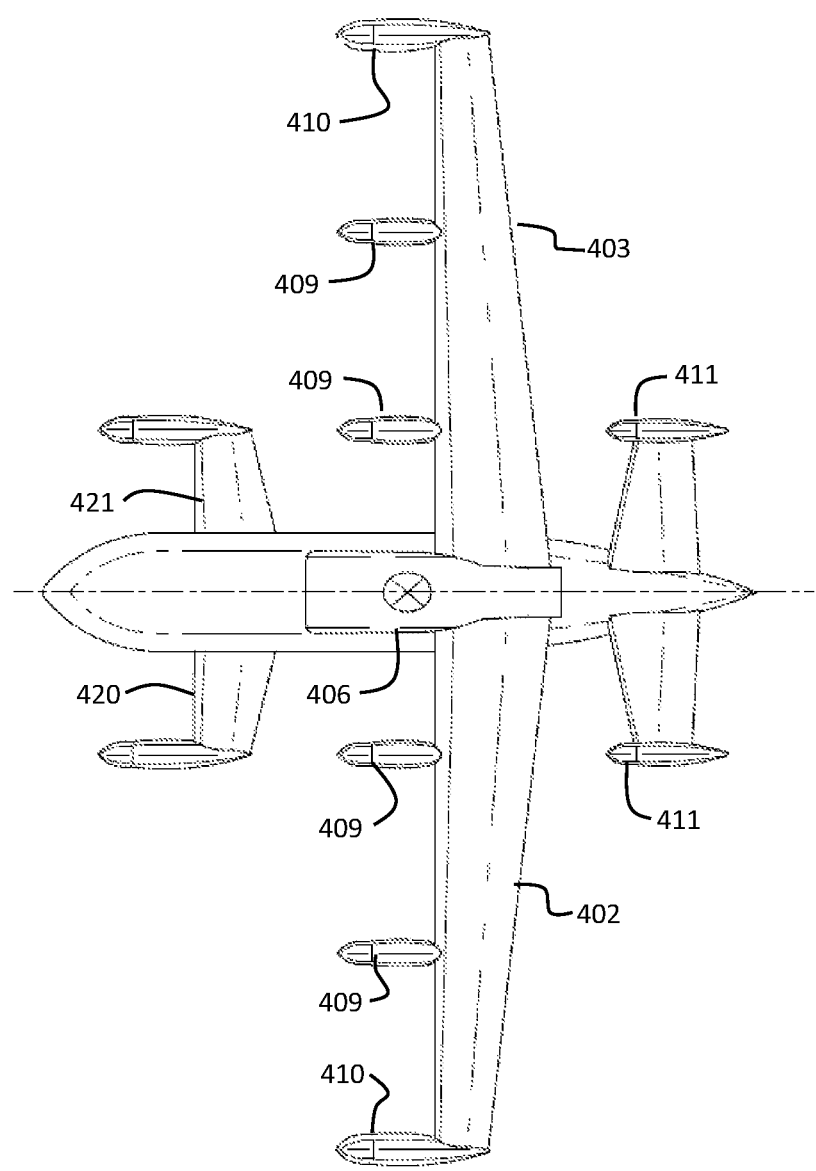
Figure 4D:
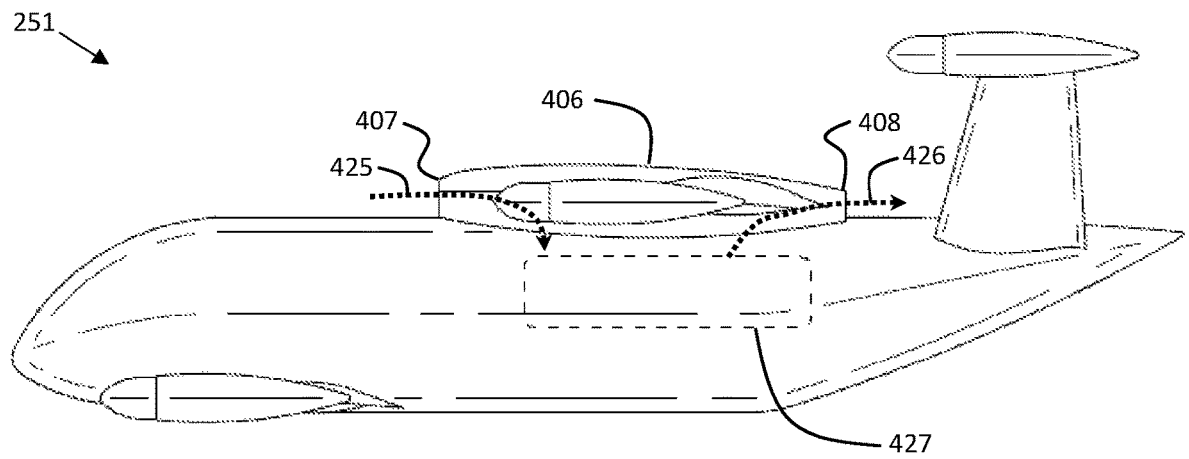
Figure 4E:
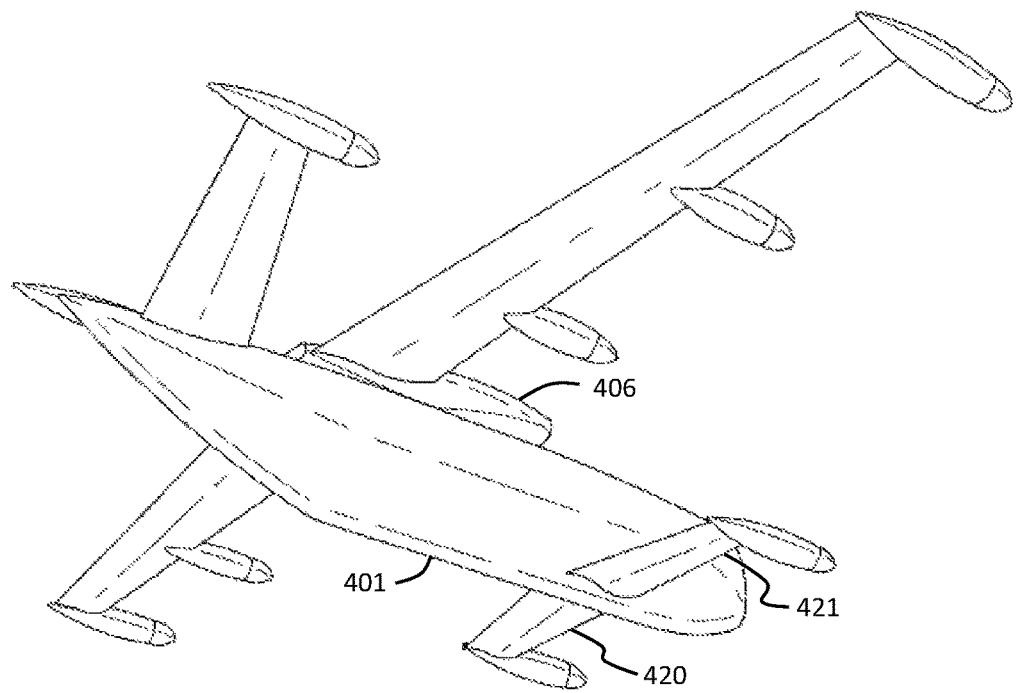

FIG. 4D illustrates an aspect of the fourth and other embodiments with regard to internal airflow. The air inlet 407 of the airflow nacelle 406 inlets airflow 425. The inletted airflow 425 may then route to an internal system 427, which may be a hydrogen fuel cell system. The internal system 427 then outlets airflow 426, which then exits via the air outlet 408 of the airflow nacelle 406. Although illustrated with the internal system 427 below the airflow nacelle in FIG. 4D, in some aspects the air inletted into the air nacelle air inlet flows within the air nacelle and then exits via the air outlet. In some aspects, as discussed further with regard to FIG. 14, air inletted into the airflow nacelle may route through a heat exchanger residing within the airflow nacelle.

Figure 5A:
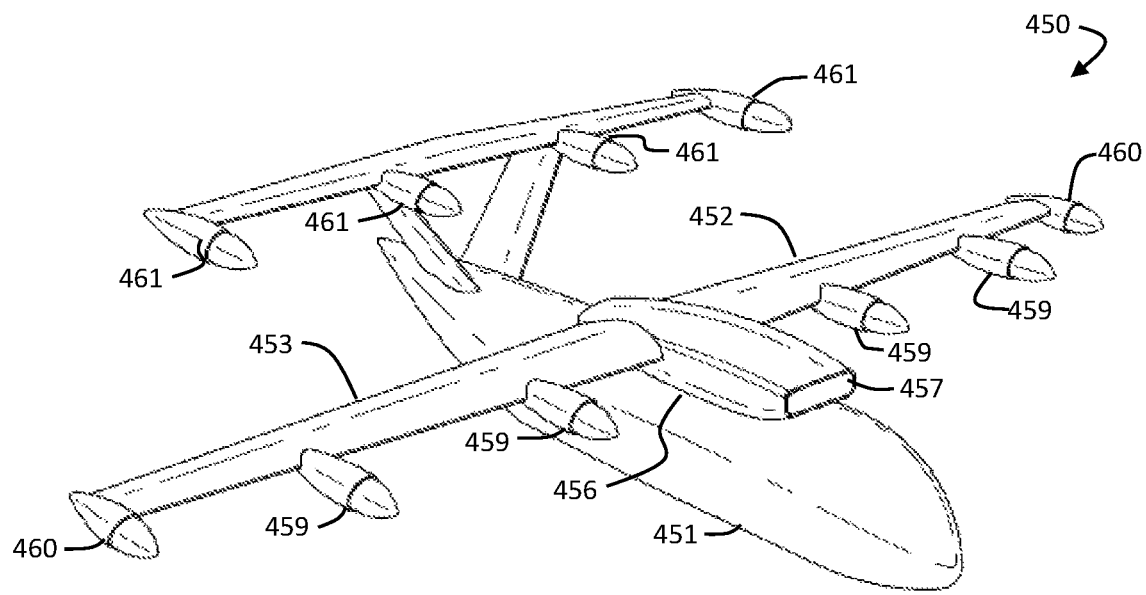
FIGS. 5A-C are views of an aerial vehicle in a fifth configuration according to some embodiments of the present invention.
Figure 5B:
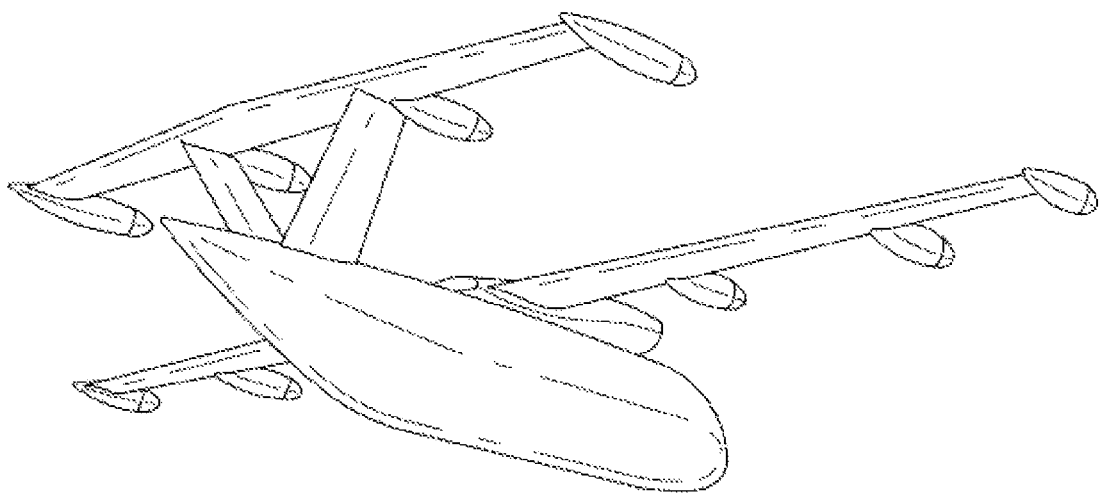
Figure 5C:
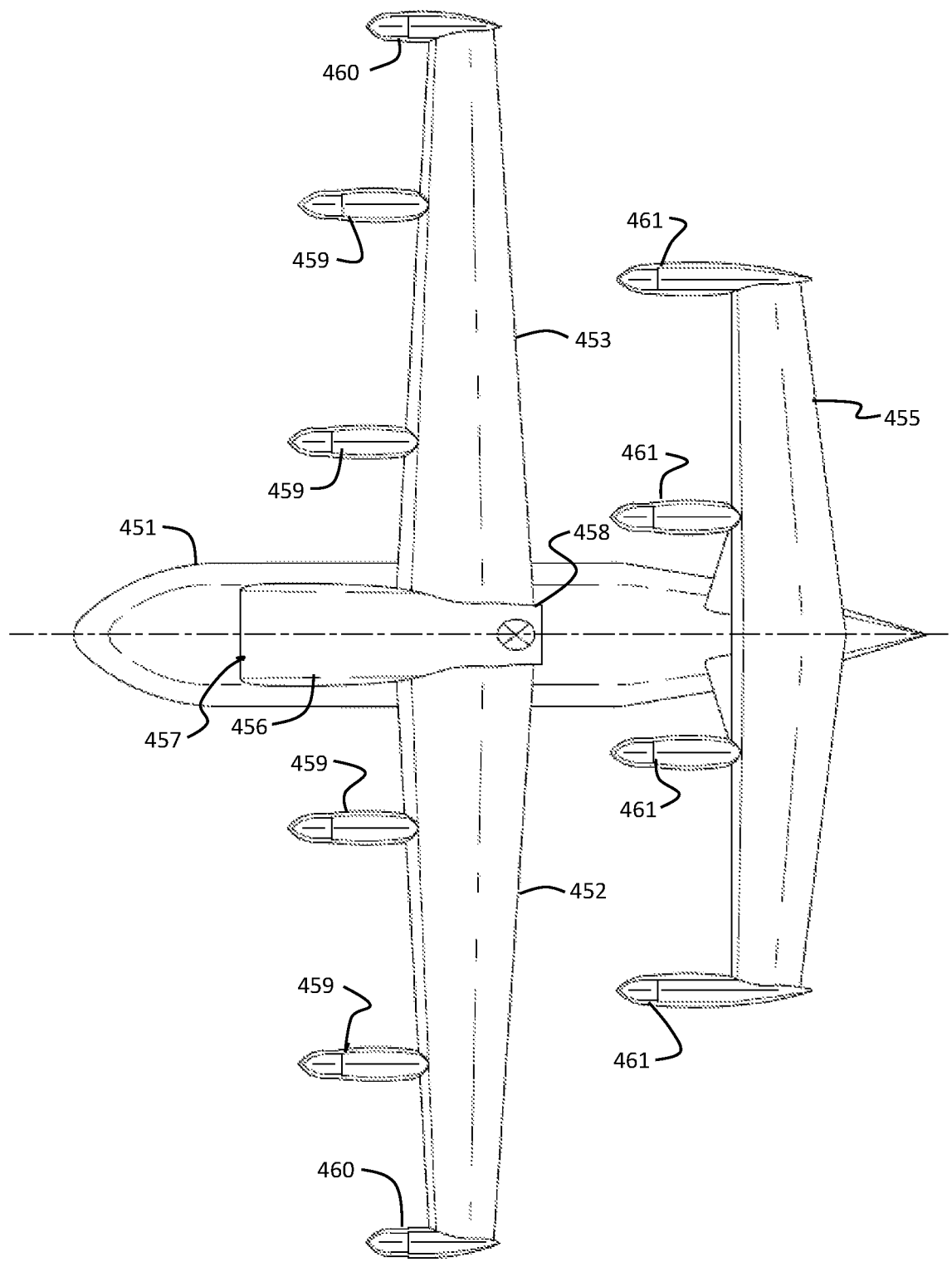

In a fifth embodiment of the present invention, as seen in FIGS. 5A-C, an aerial vehicle 450 has an airflow nacelle 456 located at the structural coupling point of the wings 452, 453 and the main body fuselage 451, and a twin v-configuration of vertical stabilizer, with a horizontal stabilizer. In utilizing this location for the airflow nacelle, the air inlet 457 of the airflow nacelle 456 integrates air inflow into an otherwise unused, and high drag, portion of the aerial vehicle 450. With the wings 452, 453 raised above the fuselage 451, an area that may have produced higher drag has been utilized as the air inlet location. The aerial vehicle 450 may be a tiltrotor aircraft, as discussed above. The longitudinal axis and the center of gravity location during loaded flight are seen in the top view of FIG. 5C.

The airflow nacelle 456 is located above the main body fuselage 451 of the aerial vehicle 401. A left wing 452 has inboard rotor assemblies 459 and a wingtip rotor assembly 460. Similarly, the right wing 453 has inboard rotor assemblies 459 and a wingtip rotor assembly 460. A horizontal stabilizer 455 above vertical stabilizers forming a v-tail has rear rotors 461 attached. A right front canard 421 and a left front canard 420 also have rotors attached. In some aspects, the left wing 452 and the right wing 453 couple to the main body fuselage 451 at or above a top surface of the main body fuselage 451. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

In this fifth embodiment, the dual v-tail structure supports a larger rear wing (horizontal stabilizer). With the airflow nacelle positioned forward the inner rear rotors may be mounted closer to the fuselage. The raised tail keeps the rear rotors out of the wing wake of the main forward wing.

The airflow nacelle 456, having an air inlet 457 at a forward end of the airflow nacelle 456, has an airflow exit 458 at a rearward end of the airflow nacelle. In some aspects, the inletted air may be routed to a thermodynamic fuel cell system, as discussed further below. In some aspects, the inletted air is routed through heat exchangers which form part of the fuel cell system.

Figure 6A:
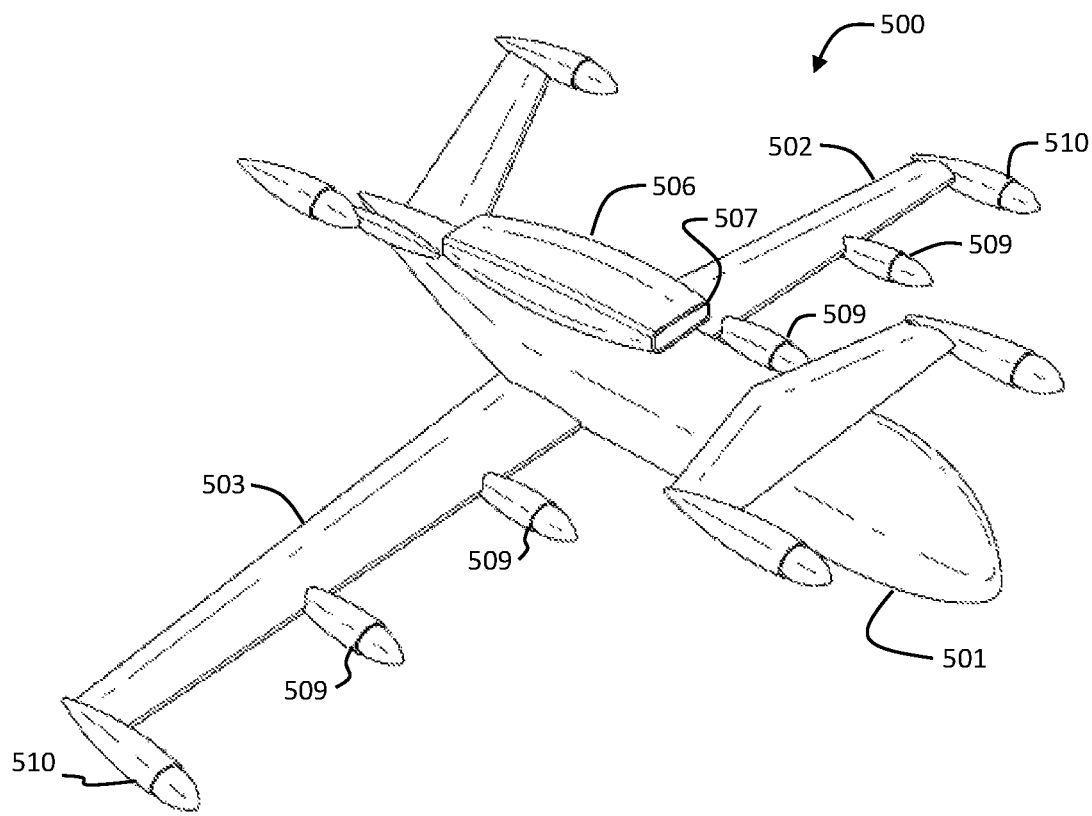
FIGS. 6A-C are views of an aerial vehicle in a sixth configuration according to some embodiments of the present invention.
Figure 6B:
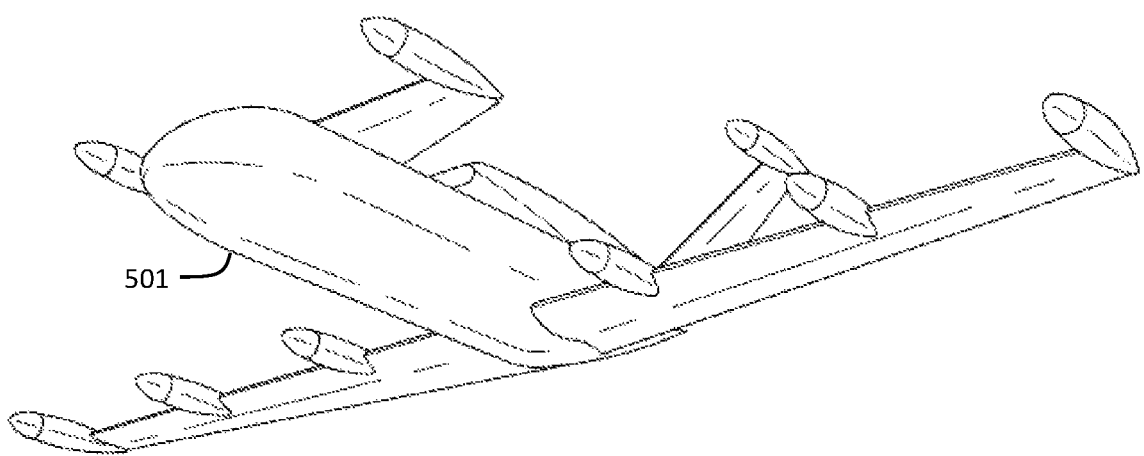
Figure 6C:
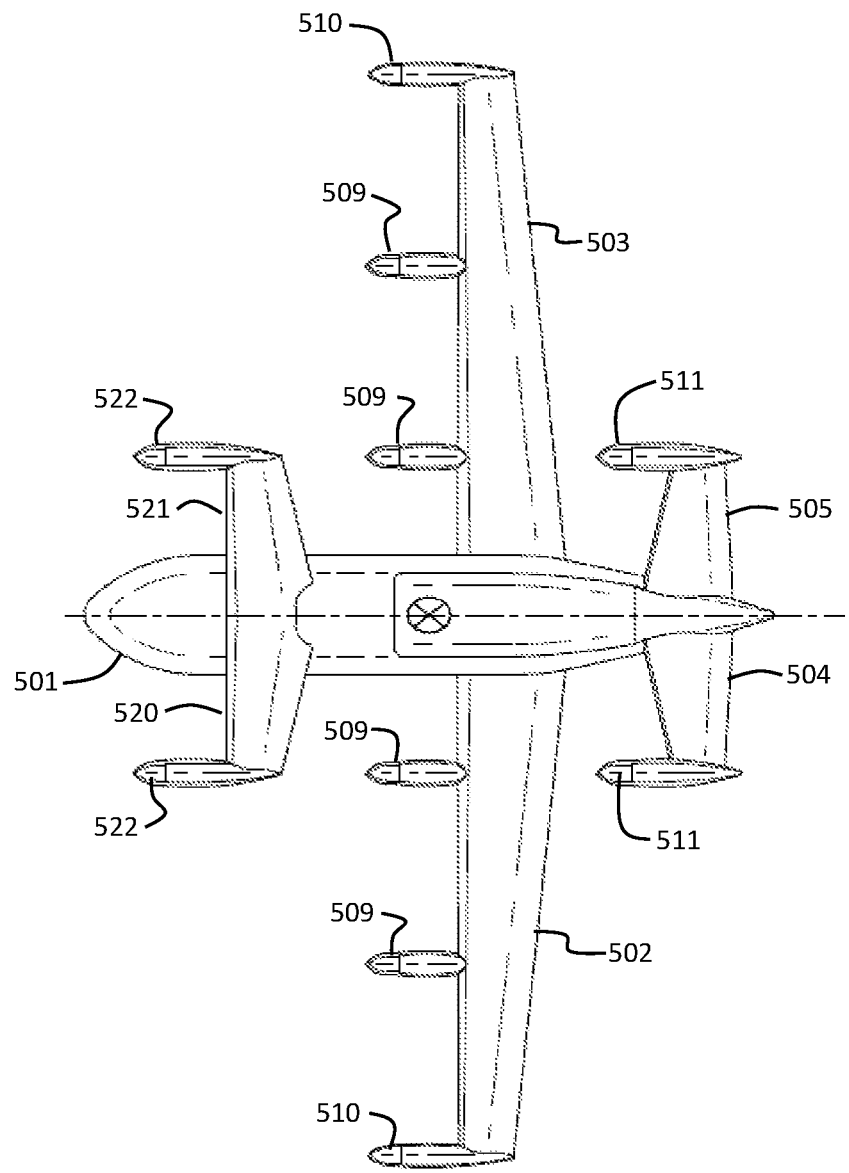

In a sixth embodiment of the present invention, as seen in FIGS. 6A-C, an aerial vehicle 500 has an airflow nacelle 506 located above the main body fuselage 501, with the wingset placed rearward on the fuselage and at a lower surface of the fuselage, and an upper front canard structure. The aerial vehicle 500 may be a tiltrotor aircraft, as discussed above.

The airflow nacelle 506 is located above the main body fuselage 501 of the aerial vehicle 501. A left wing 502 has inboard rotor assemblies 509 and a wingtip rotor assembly 510. Similarly, the right wing 503 has inboard rotor assemblies 509 and a wingtip rotor assembly 510. Horizontal stabilizers 504, 505 forming a v-tail have rear rotors 511 attached. A right front canard 521 and a left front canard 520 also have rotors 522 attached. In some aspects, the left wing 502 and the right wing 503 couple to the main body fuselage 501 at or below a bottom surface of the main body fuselage 501. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

The airflow nacelle 506, having an air inlet 507 at a forward end of the airflow nacelle 506, has an airflow exit 508 at a rearward end of the airflow nacelle. In some aspects, the inletted air may be routed to a thermodynamic fuel cell system, as discussed previously. In some aspects, the inletted air is routed through heat exchangers which form part of the fuel cell system. The longitudinal axis and the center of gravity location during loaded flight are seen in the top view of FIG. 6C, and the longitudinal axis and e.g. location are similarly shown in the top views of the subsequent embodiments.

Figure 7A:
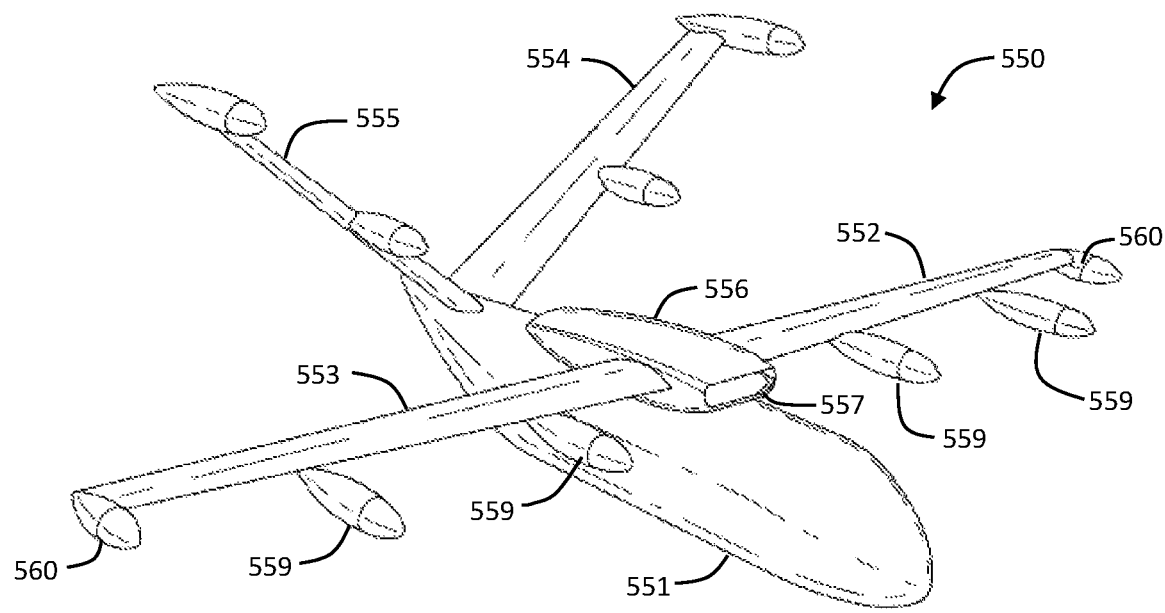
FIGS. 7A-C are views of an aerial vehicle in a seventh configuration according to some embodiments of the present invention.
Figure 7B:
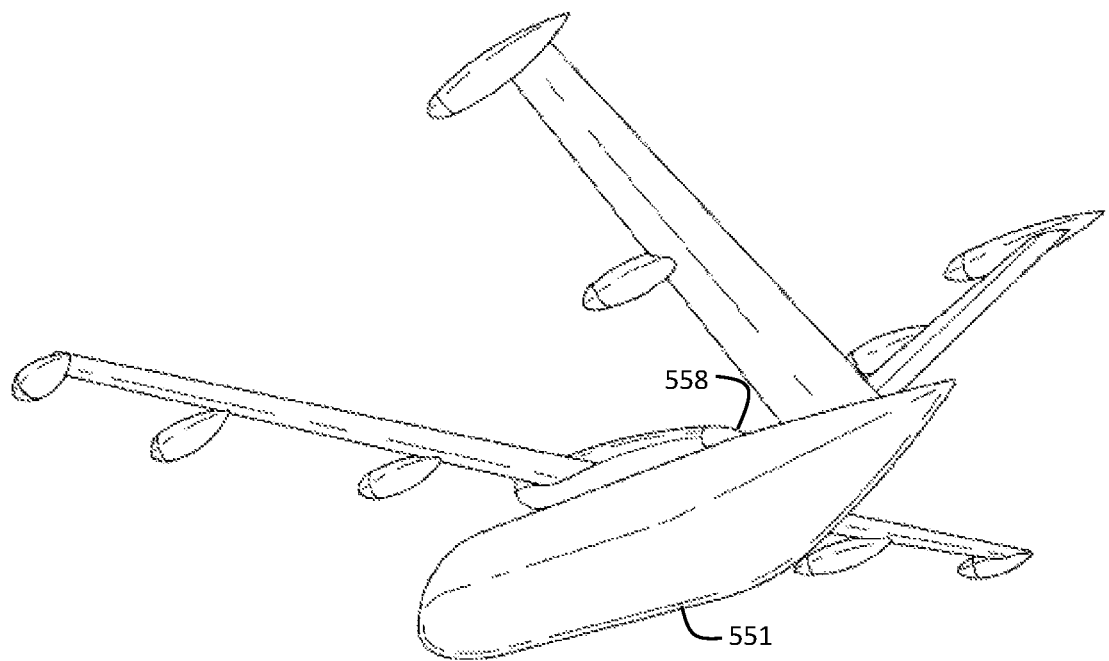
Figure 7C:
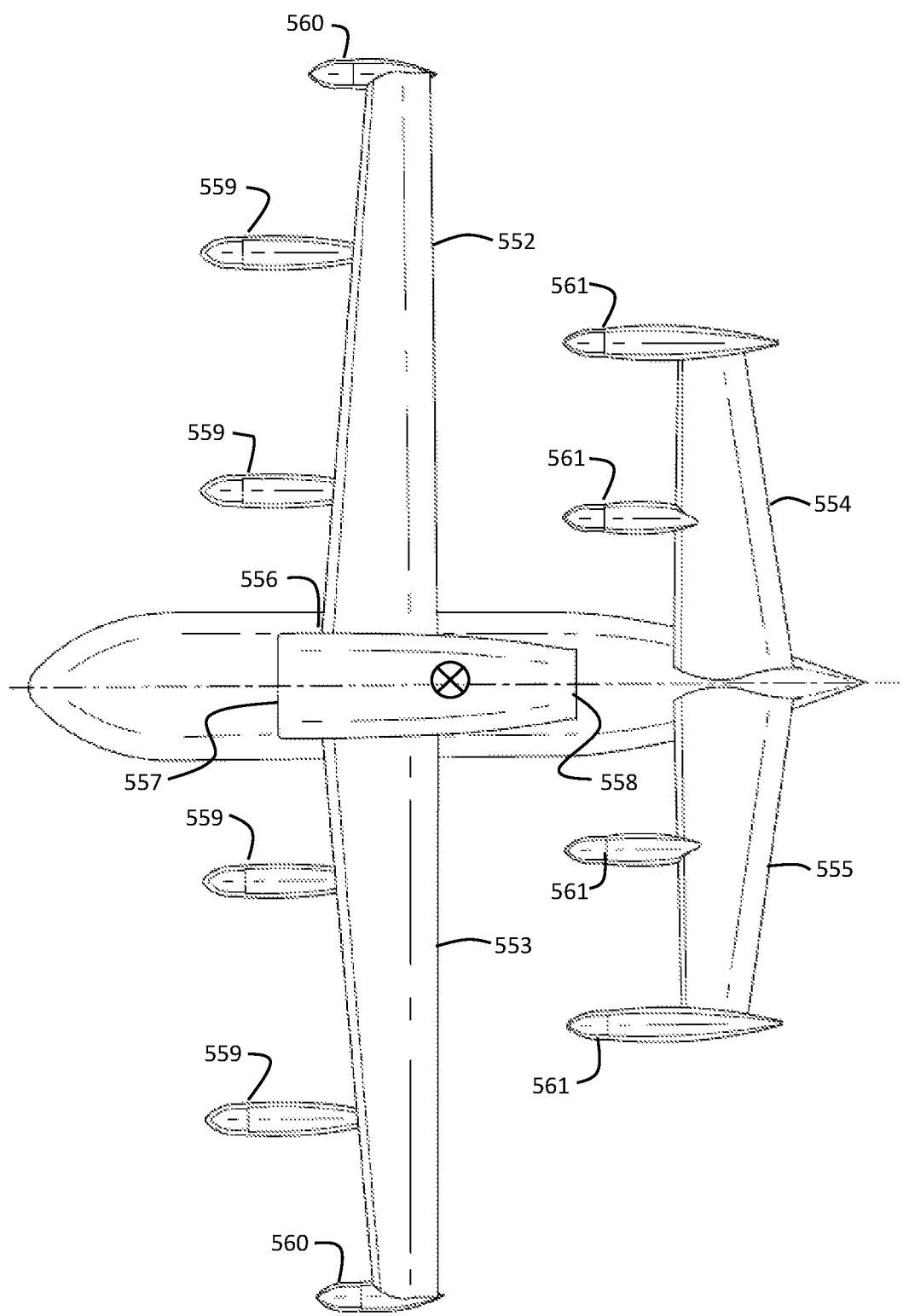

In a seventh embodiment of the present invention, as seen in FIGS. 7A-C, an aerial vehicle 550 has an airflow nacelle 556 located at the structural coupling point of the wings 552, 553 and the main body fuselage 551, and a twin v-configuration of vertical stabilizer. In utilizing this location for the airflow nacelle, the air inlet 557 of the airflow nacelle 556 integrates air inflow into an otherwise unused, and high drag, portion of the aerial vehicle 550. With the wings 552, 553 raised above the fuselage 551, an area that may have produced higher drag has been utilized as the air inlet location. The aerial vehicle 550 may be a tiltrotor aircraft, as discussed above. The longitudinal axis and the center of gravity location during loaded flight are seen in the top view of FIG. 7C.

The airflow nacelle 556 is located above the main body fuselage 551 of the aerial vehicle 501. A left wing 552 has inboard rotor assemblies 559 and a wingtip rotor assembly 560. Similarly, the right wing 553 has inboard rotor assemblies 559 and a wingtip rotor assembly 560. A right rear stabilizer 454 and a left rear stabilizer 555 forming a v-tail have rear rotors 561 attached. In some aspects, the left wing 552 and the right wing 553 couple to the main body fuselage 551 at or above a top surface of the main body fuselage 551. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

The airflow nacelle 556, having an air inlet 557 at a forward end of the airflow nacelle 556, has an airflow exit 558 at a rearward end of the airflow nacelle. In some aspects, the inletted air may be routed to a thermodynamic fuel cell system, as discussed further below. In some aspects, the inletted air is routed through heat exchangers which form part of the fuel cell system.

Figure 8A:
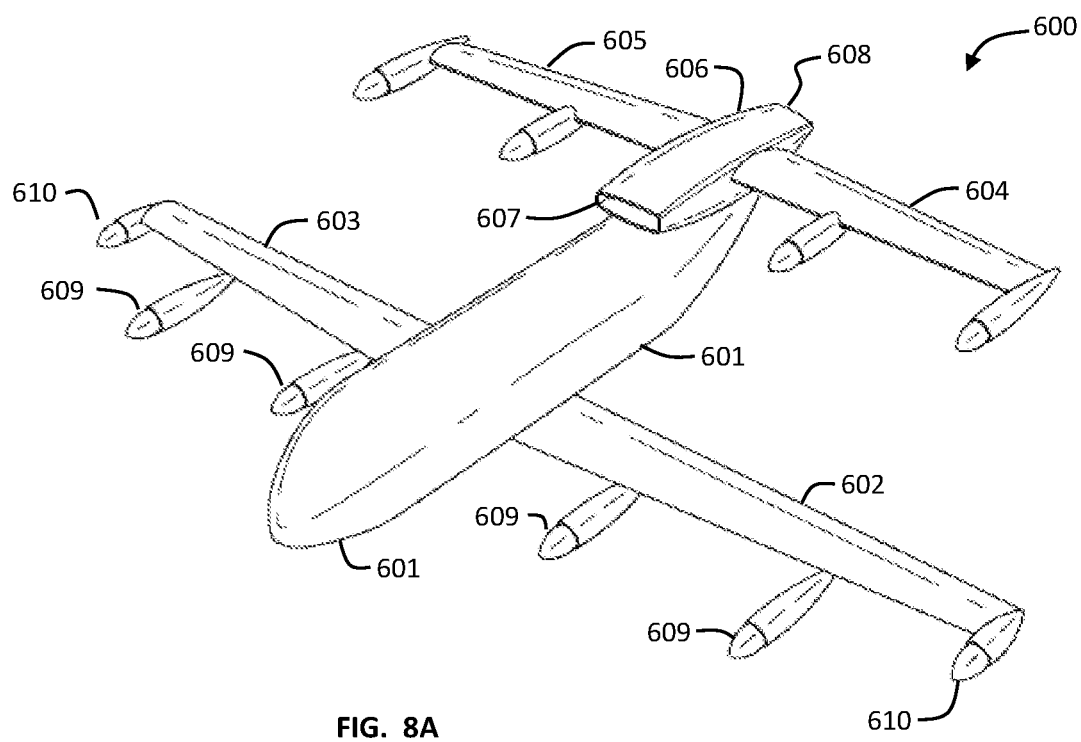
FIGS. 8A-C are views of an aerial vehicle in an eighth configuration according to some embodiments of the present invention.
Figure 8B:
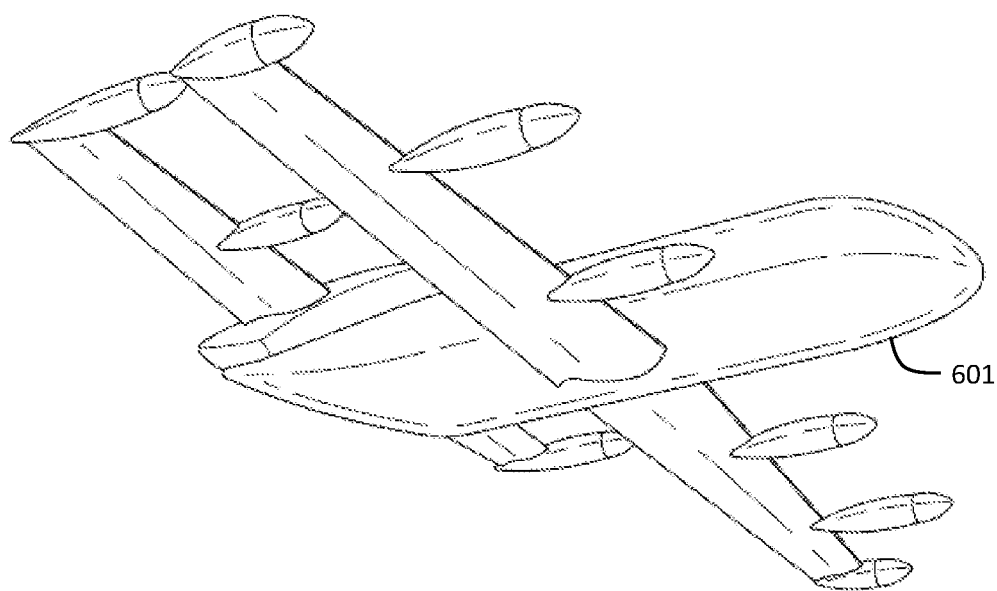
Figure 8C:
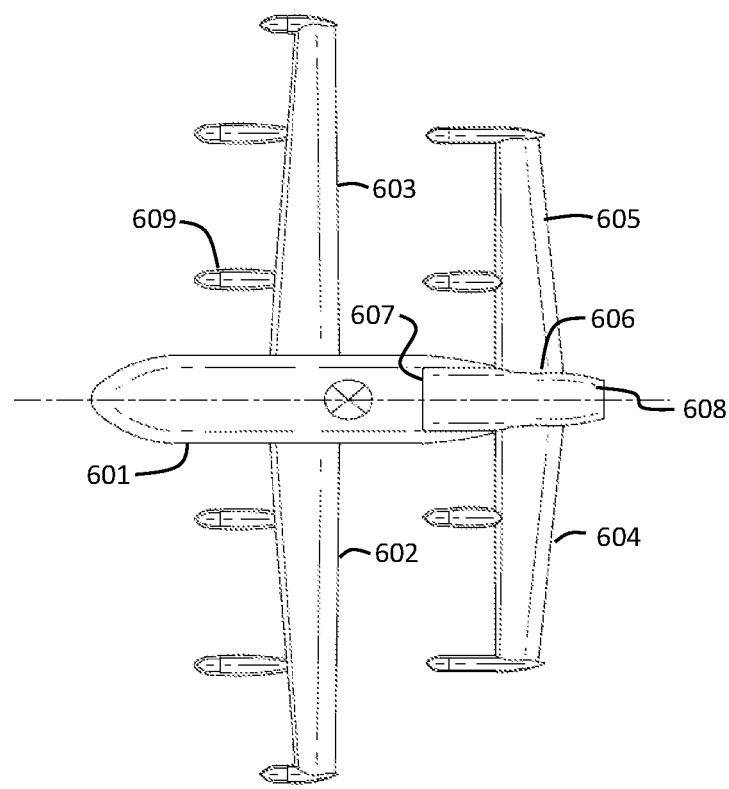
Figure 9A:
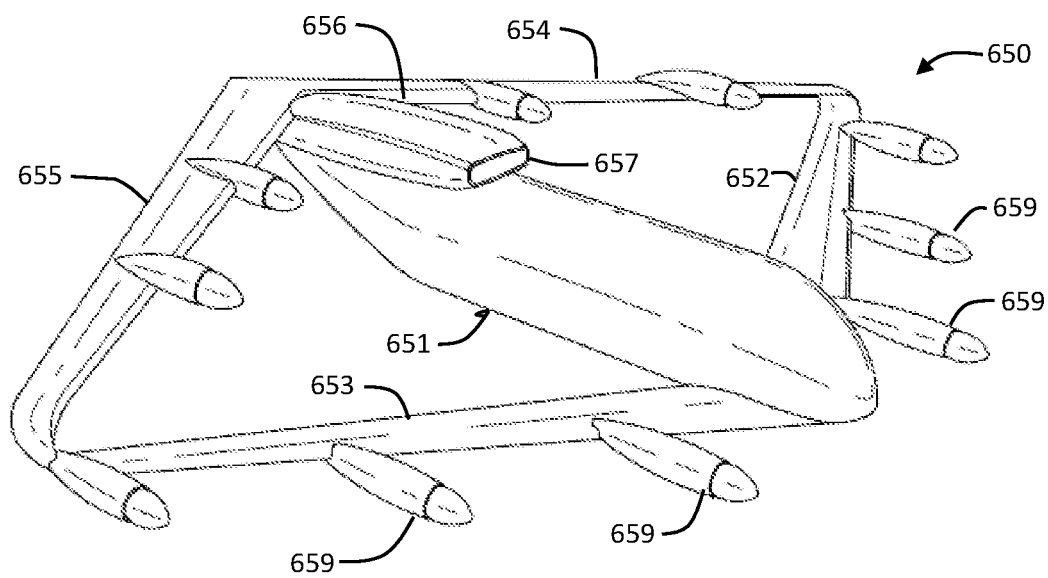
FIGS. 9A-D are views of an aerial vehicle in a ninth configuration according to some embodiments of the present invention.
Figure 9B:
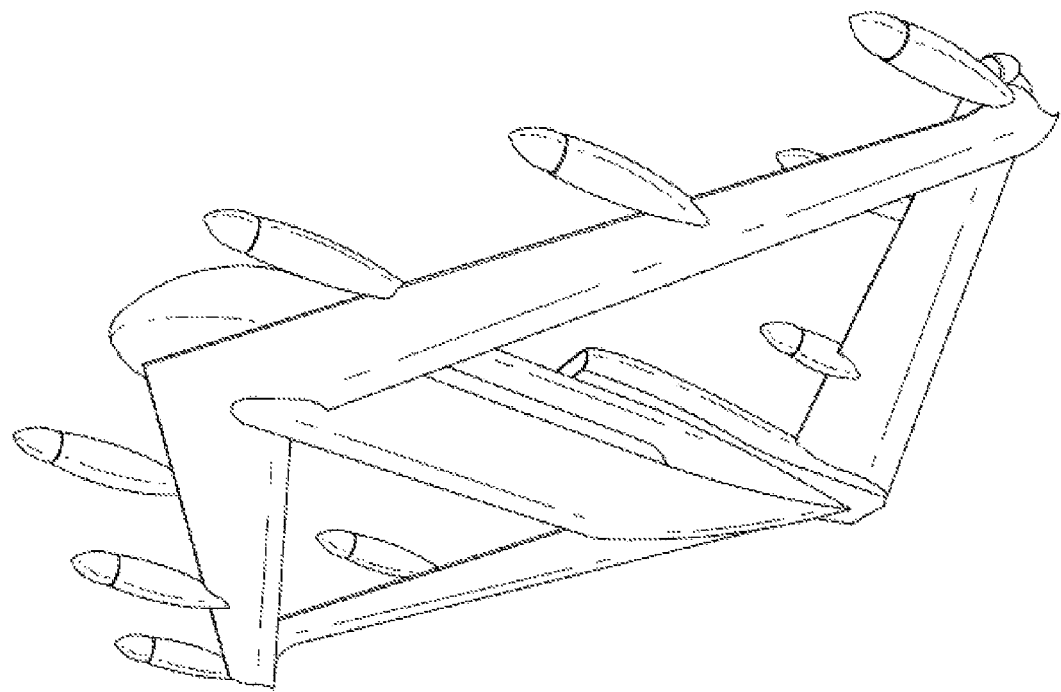
Figure 9C:
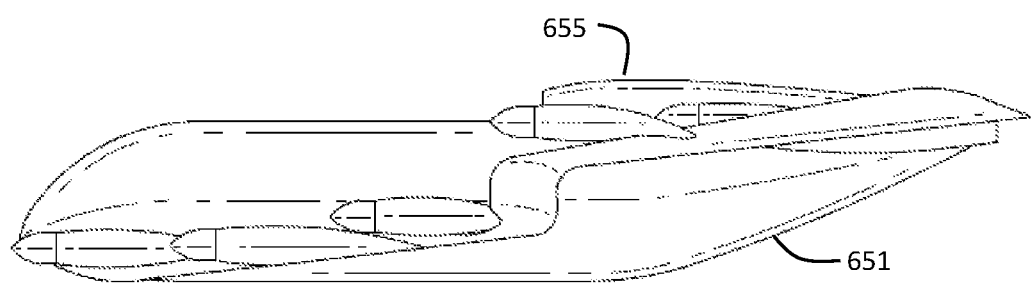
Figure 9D:
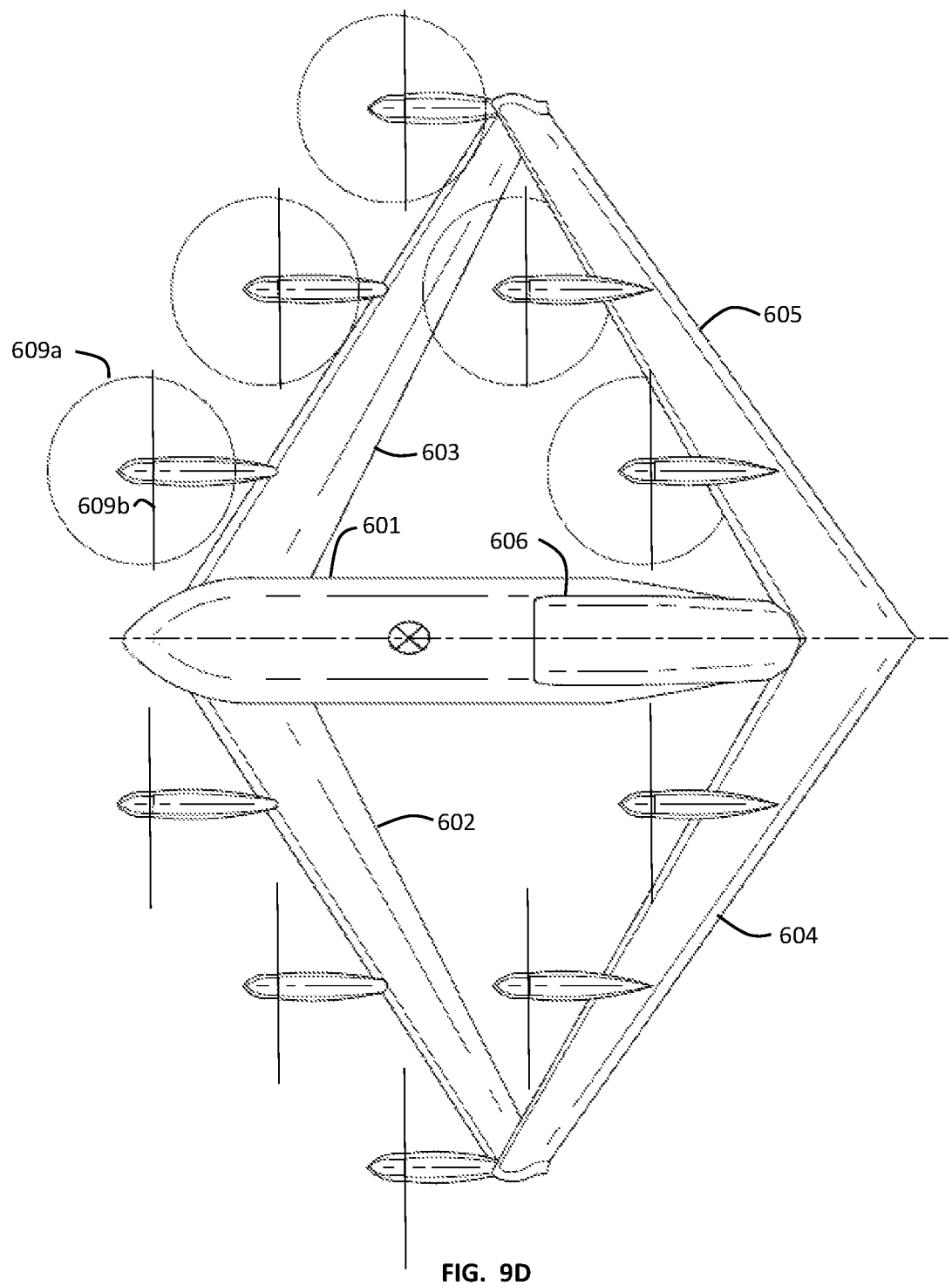

In an eighth embodiment of the present invention, as seen in FIGS. 8A-C, an aerial vehicle 600 has an airflow nacelle 606 located at the structural coupling point of the rear horizontal stabilizers 604, 605 and the main body fuselage 601. In utilizing this location for the airflow nacelle, the air inlet 607 of the airflow nacelle 606 integrates air inflow into an otherwise unused, and high drag, portion of the aerial vehicle 600. With the rear horizontal stabilizers 604, 605 raised above the fuselage 601, an area that may have produced higher drag has been utilized as the air inlet location. The aerial vehicle 600 may be a tiltrotor aircraft, as discussed above.

The airflow nacelle 606 is located above the main body fuselage 601 of the aerial vehicle 601. A left wing 602 has inboard rotor assemblies 609 and a wingtip rotor assembly 610. Similarly, the right wing 603 has inboard rotor assemblies 609 and a wingtip rotor assembly 610. In some aspects, the left wing 602 and the right wing 603 couple to the main body fuselage 601 at or below a bottom surface of the main body fuselage 601. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below. The longitudinal axis and the center of gravity location during loaded flight are seen in the top view of FIG. 8C.

In this eight embodiment, the longitudinal stations of the rotors, and the longitudinal location of the wings, are similar to that seen in the first embodiment. However, with the lower wing location the rear rotors are kept clear of the wing wake.

The airflow nacelle 606, having an air inlet 607 at a forward end of the airflow nacelle 606, has an airflow exit 608 at a rearward end of the airflow nacelle. In some aspects, the inletted air may be routed to a thermodynamic fuel cell system, as discussed further below. In some aspects, the inletted air is routed through heat exchangers which form part of the fuel cell system.

In a ninth embodiment of the present invention, as seen in FIGS. 9A-D, an aerial vehicle 650 with a box wing structure has an airflow nacelle 656 located at the structural coupling point of the rear wing portions 654, 655 of a box wing structure and the main body fuselage 651. In utilizing this location for the airflow nacelle, the air inlet 657 of the airflow nacelle 656 integrates air inflow into an otherwise unused, and high drag, portion of the aerial vehicle 650. With the rear wing portions 654, 655 of a box wing structure raised above the fuselage 651, an area that may have produced higher drag has been utilized as the air inlet location. The aerial vehicle 650 may be a tiltrotor aircraft, as discussed above. The longitudinal axis 221 and the center of gravity 220 location during loaded flight are seen in the top view of FIG. 9D.

The airflow nacelle 656 is located above the main body fuselage 651 of the aerial vehicle 651. A left forward wing 652 has inboard rotor assemblies 659. Similarly, the right forward wing 653 has inboard rotor assemblies 609, as do the rear wing portions of the box wing structure. In some aspects, the left forward wing 652 and the right forward wing 653 couple to the main body fuselage 651 at or below a bottom surface of the forward portion of the main body fuselage 651. The propellers of the rotor assemblies have been omitted from the figures for clarity in this and subsequent embodiments. The rotor assemblies may be deployed from a forward flight configuration with the rotor disc substantially perpendicular to the longitudinal axis to a hover position delivering primarily vertical thrust using deployment mechanisms discussed with regard to FIGS. 10A-B, 11, and 12A-B, below.

The airflow nacelle 656, having an air inlet 657 at a forward end of the airflow nacelle 656, has an airflow exit 658 at a rearward end of the airflow nacelle. In some aspects, the inletted air may be routed to a thermodynamic fuel cell system, as discussed further below. In some aspects, the inletted air is routed through heat exchangers which form part of the fuel cell system.

Figure 10A:
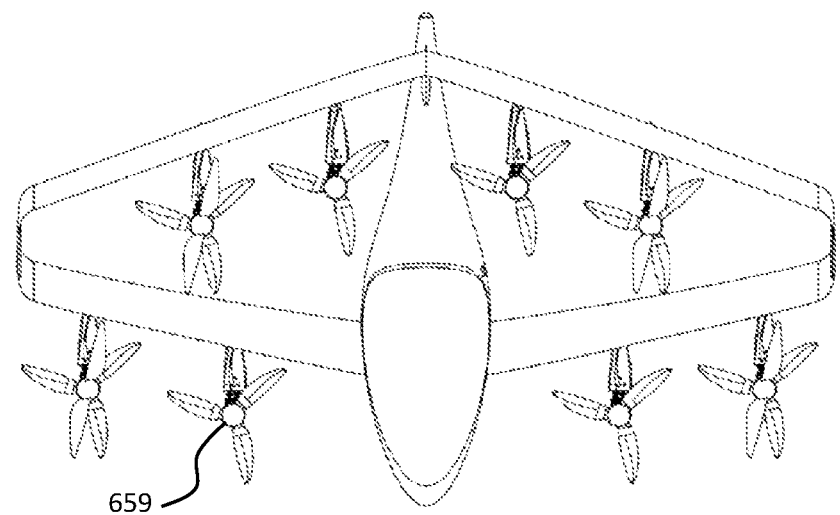
FIGS. 10A-B are illustrative views of deployed rotors according to some embodiments of the present invention.
Figure 10B:
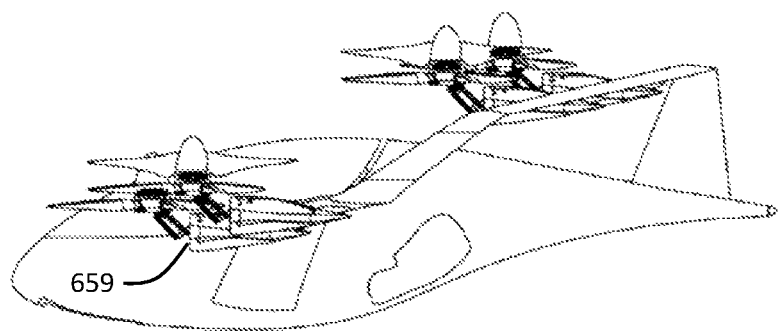

FIGS. 10A-B illustrate the hover configuration of a box wing VTOL aircraft, which displays the manner in which rotor assemblies may be configures during hover mode. As can be seen, the rotor assemblies 659 have been deployed to a position which pushed the rotors forward and upward relative to the forward flight configuration. It is to be understood that the deployment mechanisms and systems seen in FIGS. 10A-B may be used in the above-mentioned embodiments.

Figure 11:
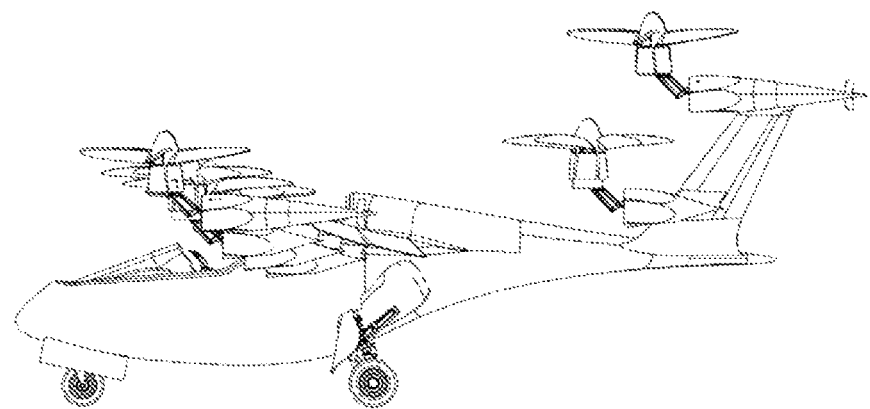
FIG. 11 is a view of deployed rotors according to some embodiments of the present invention.
Figure 12A:
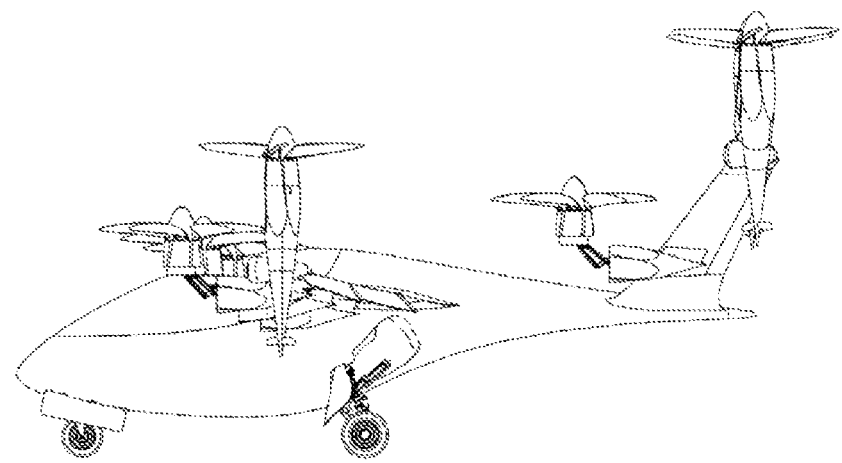
FIGS. 12A-B are views of deployed rotors according to some embodiments of the present invention.
Figure 12B:
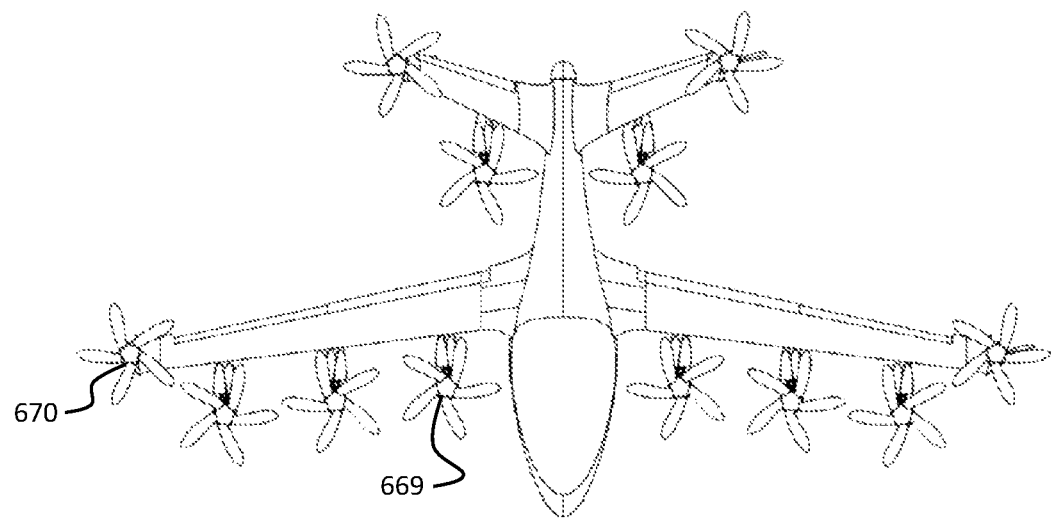

FIGS. 11 and 12A-B illustrate a contrast between rotors 669 which all have been deployed forward and upward, as seen in FIG. 11, and an aircraft wherein the wingtip rotors 670 have pivoted to a hover configuration, as seen in FIGS. 12A-B. It is to be understood that the deployment mechanisms and systems seen in FIGS. 11 and 12A-B may be used in the above-mentioned embodiments, as appropriate.

Figure 13:
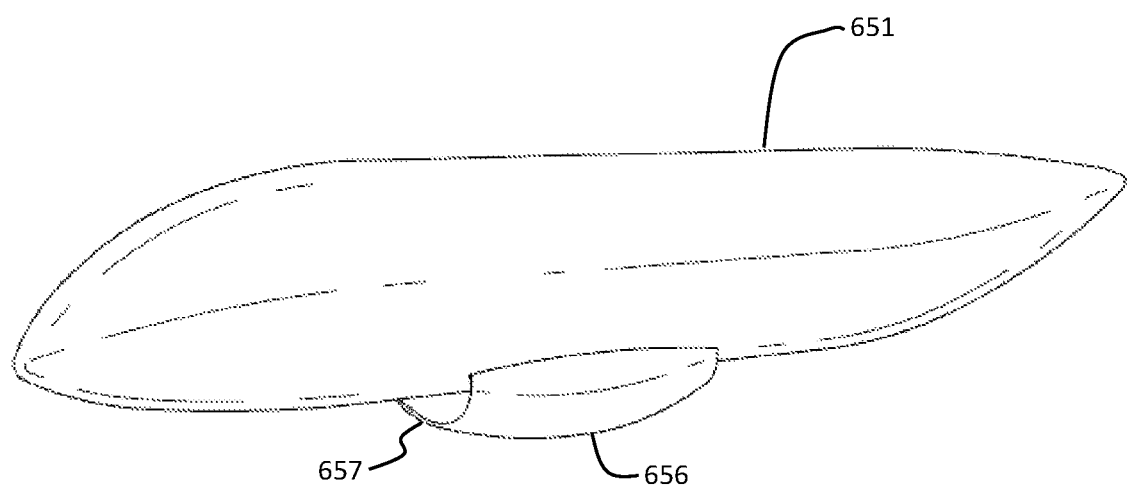
FIG. 13 is a view of a fuselage with lower air intake nacelle according to some embodiments of the present invention.

FIG. 13 illustrates another airflow nacelle location according to other embodiments of the present invention. The airflow nacelle 656 is located such that it is forward of where the landing gear cowlings would be protruding from the fuselage 651. In this configuration, the air inlet 657 ingests air which would otherwise be causing drag on and around the landing gear bulge. In some aspects, the inletted air may be routed to a thermodynamic fuel cell system, as discussed further below. In some aspects, the inletted air is routed through heat exchangers which form part of the fuel cell system.

Figure 14:
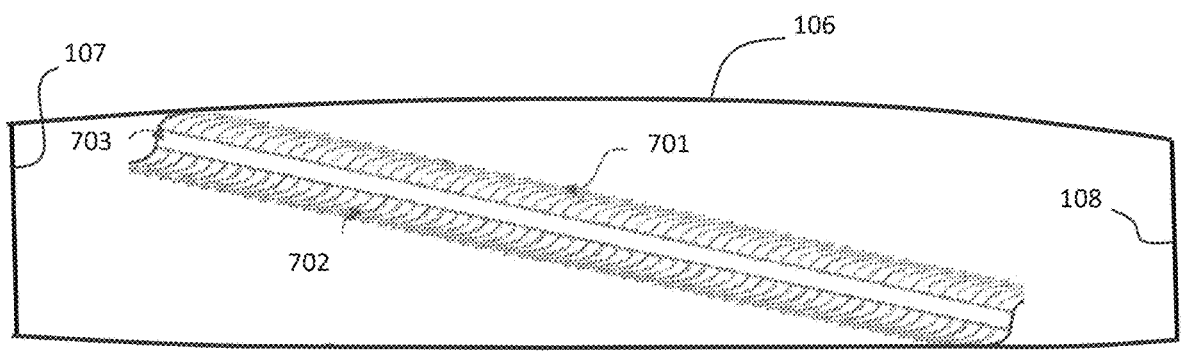
FIG. 14 is a partial cross-sectional view of an airflow nacelle according to some embodiments of the present invention.

FIG. 14 illustrates, in partial cross-section, the interior of an airflow nacelle 106 according to some embodiments of the present invention. Air enters the airflow nacelle through an air inlet 105 where it will pass through a heat exchanger 703, which may be placed at a sloping angle within the airflow nacelle. A plurality of forward diffuser plates 702 moderate the flow of the inletted air, and may also direct the airflow into a direction more perpendicular to the heat exchanger. After passing through the heat exchanger, the airflow may continue through aft deflector plates 701. The airflow then continues to the airflow outlet 108. Although discussed with the airflow nacelle 106 of the first embodiment, it is to be understood that this internal arrangement may be utilized with the airflow nacelles of any of the disclosed embodiments.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A aerial vehicle, said aerial vehicle comprising:
   a main body fuselage;
   a left wing coupled to said main body fuselage at the top of said main body fuselage at a first location along a longitudinal axis of said aerial vehicle;
   a right wing coupled to said main body fuselage at the top of said main body fuselage at said first location;
   an airflow nacelle coupled to an upper surface of said main body fuselage, said airflow nacelle comprising an air inlet at a forward end, said forward end of airflow nacelle forward of the leading edges of said left wing and said right wing where said left wing and said right wing couple to said main body fuselage, said airflow nacelle comprising an air outlet at a rearward end;
   a left side rear stabilizer coupled to said main body fuselage rearward of said first location; and
   a right side rear stabilizer coupled to said main body fuselage rearward of said first location,
   wherein said airflow nacelle is coupled to said main body fuselage proximal to the junction points of said left side wing and right side wing to said main body fuselage.

2. An aerial vehicle, said aerial vehicle comprising:
   a main body fuselage;
   a left wing coupled to said main body fuselage at the top of said main body fuselage;
   a right wing coupled to said main body fuselage at the top of said main body fuselage;
   an airflow nacelle coupled to an upper surface of said main body fuselage, said airflow nacelle comprising an air inlet at a forward end, said forward end of airflow nacelle forward of the leading edges of said left wing and said right wing where said left wing and said right wing couple to said main body fuselage, said airflow nacelle comprising an air outlet at a rearward end;
   a left side rear stabilizer coupled to said main body fuselage; and
   a right side rear stabilizer coupled to said main body fuselage,
   wherein said airflow nacelle is coupled to said main body fuselage proximal to the junction points of said left side wing and right side wing to said main body fuselage, and wherein there is no engine within said airflow nacelle.

3. The aerial vehicle of claim 2 further comprising:
   a plurality of left side rotor assemblies coupled to said left side wing;
   a plurality of right side rotor assemblies coupled to said right side wing;
   one or more left rear rotor assemblies coupled to said left side horizontal stabilizer; and
   one or more right rear rotor assemblies coupled to said right side horizontal stabilizer.

4. The aerial vehicle of claim 3 wherein said rotor assemblies are deployable from a forward facing forward flight configuration to a vertical facing hover configuration.

5. The aerial vehicle of claim 4 wherein said airflow nacelle comprises a diffuser and a heat exchanger within an airflow chamber within said airflow nacelle rearward of said air inlet and forward of said air outlet.

6. The aerial vehicle of claim 2 wherein said airflow nacelle comprises a diffuser and a heat exchanger within an airflow chamber within said airflow nacelle rearward of said air inlet and forward of said air outlet.

7. An aerial vehicle, said aerial vehicle comprising:
   a main body fuselage;
   a left wing coupled to said main body fuselage at the top of said main body fuselage;
   a right wing coupled to said main body fuselage at the top of said main body fuselage;
   an airflow nacelle coupled to an upper surface of said main body fuselage, said airflow nacelle comprising an air inlet at a forward end, said forward end of airflow nacelle forward of the leading edges of said left wing and said right wing where said left wing and said right wing couple to said main body fuselage, said airflow nacelle comprising an air outlet at a rearward end, said airflow nacelle comprising a diffuser and a heat exchanger within an airflow chamber within said airflow nacelle rearward of said air inlet and forward of said air outlet;
- a left side rear stabilizer coupled to said main body fuselage; and
- a right side rear stabilizer to said main body fuselage, said airflow nacelle is coupled to said main body fuselage proximal to the junction points of said left side wing and right side wing to said main body fuselage.

8. The aerial vehicle of claim 3 wherein said aerial vehicle further comprises a forward wing, said forward wing comprising:
- one or more right side front rotor assemblies; and
- one or more left side front rotor assemblies, wherein said right side and said left side front rotor assemblies are deployable from a forward flight configuration to a hover configuration.

* * * * *